United States Patent
Ellis et al.

(10) Patent No.: US 11,352,726 B2
(45) Date of Patent: Jun. 7, 2022

(54) APPARATUS, SYSTEMS, AND METHODS FOR FINISHING A YARNED STRAP

(71) Applicant: Facebook Technologies, LLC, Menlo Park, CA (US)

(72) Inventors: Shane Michael Ellis, Bellevue, WA (US); Kristen Renee Hayenga, Redmond, WA (US); Quintin Morris, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 213 days.

(21) Appl. No.: 16/727,855

(22) Filed: Dec. 26, 2019

(65) Prior Publication Data
US 2021/0198838 A1 Jul. 1, 2021

(51) Int. Cl.
| | |
|---|---|
| *D06H 7/00* | (2006.01) |
| *D06C 7/02* | (2006.01) |
| *D06H 7/22* | (2006.01) |
| *D06H 7/02* | (2006.01) |
| *B29C 49/50* | (2006.01) |

(52) U.S. Cl.
CPC .............. *D06C 7/02* (2013.01); *B29C 49/50* (2013.01); *D06H 7/005* (2013.01); *D06H 7/02* (2013.01); *D06H 7/223* (2013.01); *D10B 2401/061* (2013.01)

(58) Field of Classification Search
None
See application file for complete search history.

(56) References Cited

U.S. PATENT DOCUMENTS

| | | | | |
|---|---|---|---|---|
| 3,616,013 A | * | 10/1971 | Bocchi | B31B 70/00 156/224 |
| 4,127,637 A | * | 11/1978 | Pietreniak | D04H 1/66 156/209 |
| 5,277,359 A | * | 1/1994 | Lindsay | B65D 5/46016 220/754 |
| 5,364,686 A | * | 11/1994 | Disselbeck | B29D 24/002 428/174 |
| 5,701,893 A | * | 12/1997 | Kern | A41D 13/1123 128/206.19 |
| 6,146,122 A | * | 11/2000 | Kato | B29C 43/203 264/257 |
| 6,403,196 B1 | * | 6/2002 | Bessey | B29C 51/004 428/166 |
| 2004/0222259 A1 | * | 11/2004 | Brosofsky | A45F 5/00 224/257 |

(Continued)

*Primary Examiner* — Monica A Huson
(74) *Attorney, Agent, or Firm* — FisherBroyles, LLP

(57) ABSTRACT

The disclosed method may include bending, by an end-shaping tool, a portion of an end of a strap in a direction at least substantially perpendicular to a plane of the strap. The bending may include extending the portion of the end of the strap over a raised area of a first portion of the end-shaping tool and connecting a second portion of the end-shaping tool to the first portion. The connecting may include placing a recessed area of the second portion over the raised area of the first portion. The method may include debossing, by an end-setting tool dimensioned to accommodate the strap as bent by the end-shaping tool, the portion of the end of the strap at the bend. Various other methods, systems, and apparatus are also disclosed.

20 Claims, 19 Drawing Sheets

(56) References Cited

U.S. PATENT DOCUMENTS

| | | | |
|---|---|---|---|
| 2006/0046029 A1* | 3/2006 | Cho | B32B 27/32 |
| | | | 428/156 |
| 2015/0111451 A1* | 4/2015 | Date | B60N 2/58 |
| | | | 442/184 |
| 2017/0265611 A1* | 9/2017 | Vandevelde | B29C 70/465 |

* cited by examiner

APPARATUS, SYSTEMS, AND METHODS FOR FINISHING A YARNED STRAP

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1A:
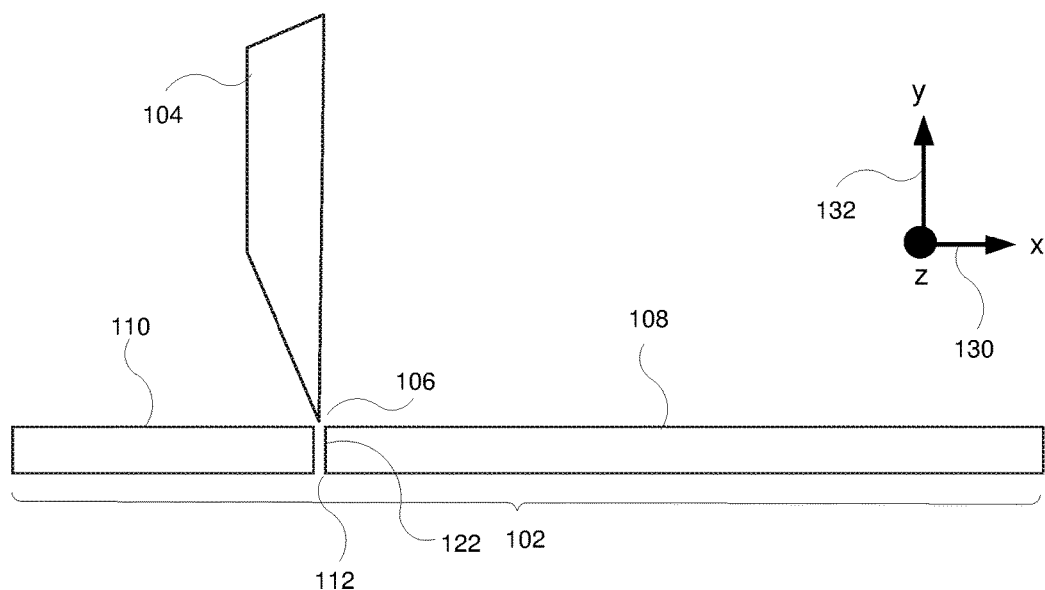
FIG. 1A is an illustration of an example of cutting a strip of fabric perpendicular to a plane of the fabric.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

A strap may be used to fasten or connect one item to another and may be made from a material woven in strips or bands. When using a strap to fasten one item to another, the strap may be cut to a desired size or length, and cutting the strap may result in the fraying of the cut ends of the strap. Fraying can eventually lead to the cut ends of the strap unraveling, which may be problematic and may result in a compromised connection between the strap and an object connected, fastened, or otherwise attached to the strap. In addition, the fraying may result in an unsightly connection between the cut end of the strap and the object to which the strap is fastened.

The present disclosure is generally directed to apparatuses, systems, and methods for finishing a yarned strap in a way that reduces or eliminates fraying at a cut end of the strap. As will be explained in greater detail below, embodiments of the present disclosure may shape a cut end of a strap by applying heat to an end-shaping tool that encases the cut end of the strap. The end-shaping tool may be designed to fold down the cut end of the strap by encasing it in the tool while applying enough heat to relax and set the strap's fibers without shrinking the strap. This may result in the cut end of the strap being folded down (e.g., at approximately a 90-degree angle to the strap) or otherwise shaped. The folded end of the strap may then be placed (e.g., encased) in an end-setting tool, and heat applied to the strap via the end-setting tool may melt the fibers in the folded end of the strap above the frayed portion. In some embodiments, the heat may be carefully applied in a deboss region of the folded down portion of the strap without shrinking the strap. After debossing is completed, a cutter may trim the cut end of the strap in the deboss region, resulting in the cut end of the strap having a clean appearance that may be significantly less likely to fray or unravel. The processes and systems described herein may provide a variety of additional features and advantages, such as increased reliability of straps and their connections to various objects, improved strap aesthetics, and more efficient and effective manufacturing techniques.

Features from any of the embodiments described herein may be used in combination with one another in accordance with the general principles described herein. These and other embodiments, features, and advantages will be more fully understood upon reading the following detailed description in conjunction with the accompanying drawings and claims. In the following description, the discussion corresponding to FIGS. 1A-5B covers examples of strap cutting and shaping tools and processes, and the discussion corresponding to FIGS. 6-9 covers examples of and processes for using debossing tools. Furthermore, the discussion corresponding to FIGS. 10 and 11 covers systems and methods for cutting debossed straps, the discussion corresponding to FIGS. 12 and 13 describes finished strap ends, and the discussion corresponding to FIGS. 14 and 15 presents examples of coupling finished strap ends to an artificial-reality headset.

FIG. 1A is an illustration of an example of cutting a piece or strip of fabric 102 perpendicular to a plane of the fabric. In the example shown in FIG. 1A, the plane of the fabric 102 is parallel to an x axis 130. A cutter 104 may cut the fabric 102 at a location 106, cutting the fabric into a first piece of fabric 108 and a second piece of fabric 110. The cutter 104 may make a cut 112 in the fabric 102 perpendicular to the plane of the fabric (e.g., perpendicular to the x axis 130 and parallel to a y axis 132) at the location 106. In some embodiments, the cutter 104 may also make the cut 112 at any other suitable angle (e.g., 45 degrees, 60 degrees, etc.) relative to a plane of the fabric.

The strips or pieces of fabric discussed herein may be made into straps made from various types of materials. For example, the fabric 102 may be a type of woven fabric, an elastic, a knitted fabric, a fibrous fabric, or a webbing. Furthermore, the fabric 102 may be made from any suitable material, including nylon, rayon, polypropylene, or other polymeric materials.

In additional to being made from various materials, the straps presented herein may be used with a variety of devices and systems. For example, the fabric 102 may be a piece or strip of fabric used as a strap to connect two objects, to connect two parts of a system, device, or apparatus, and/or to hold an object in place. In some embodiments, as will be shown and described in connection with FIGS. 14 and 15, the strap may be incorporated as part of a head-mounted display system.

The straps discussed herein may be cut at one or both ends of the strap. In some implementations, cutting a strap perpendicular to the plane of the fabric may result in the cut end fraying. For example, cutting the strap perpendicular to the plane of the fabric may expose a cross section of the material of the fabric resulting in a cut end that appears unfinished, frayed, and/or rough.

Figure 1B:
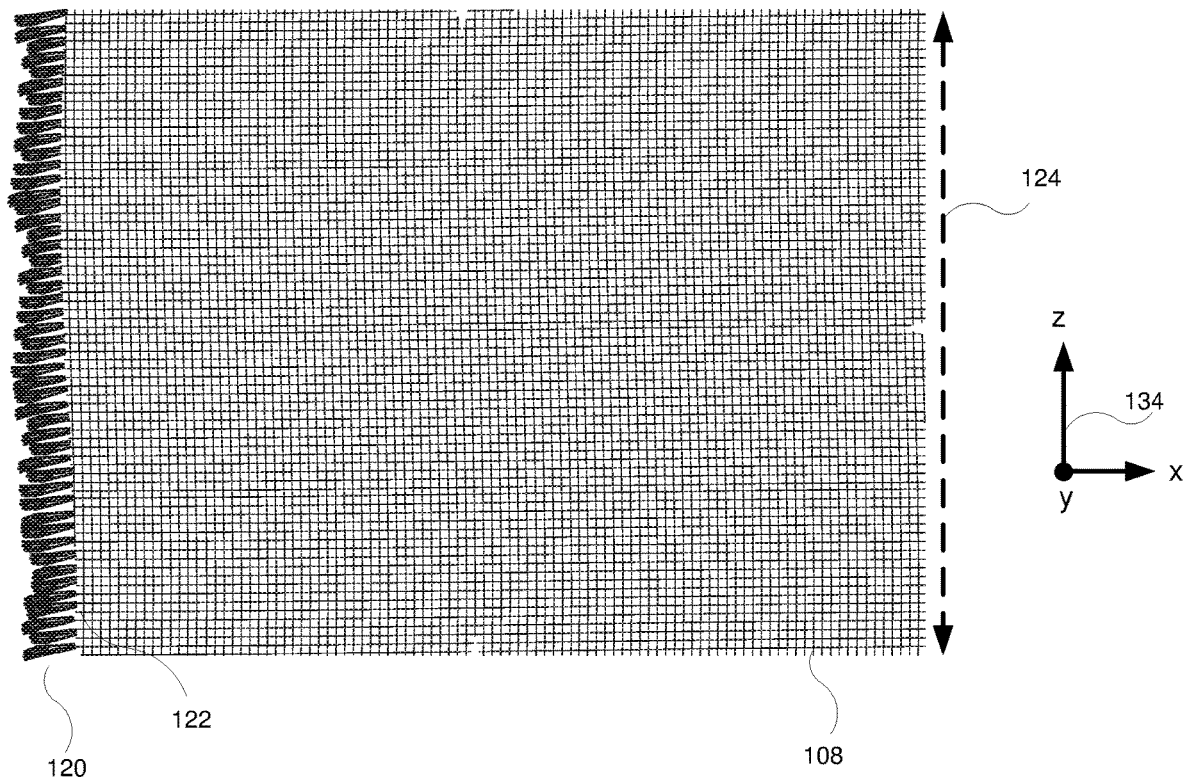
FIG. 1B is an illustration of a piece of fabric after cutting the fabric perpendicular to a plane of the fabric.

FIG. 1B is an illustration of the first piece of fabric 108 after cutting the fabric 102 perpendicular to a plane of the fabric. FIG. 1B shows the first piece of fabric 108 with fraying 120 at a cut end 122 of the first piece of fabric 108. For example, the first piece of fabric 108 may be a strap having a width 124. The width 124 of the first piece of fabric 108 may be along a z axis 134. A strap may include more than one cut end (e.g., two cut ends). As described herein, and in particular with reference to FIGS. 3-11, the cut end 122 may be shaped or formed and then treated to eliminate the fraying 120 in order to produce a smooth, clean, and formed end of the strap.

Figure 2:
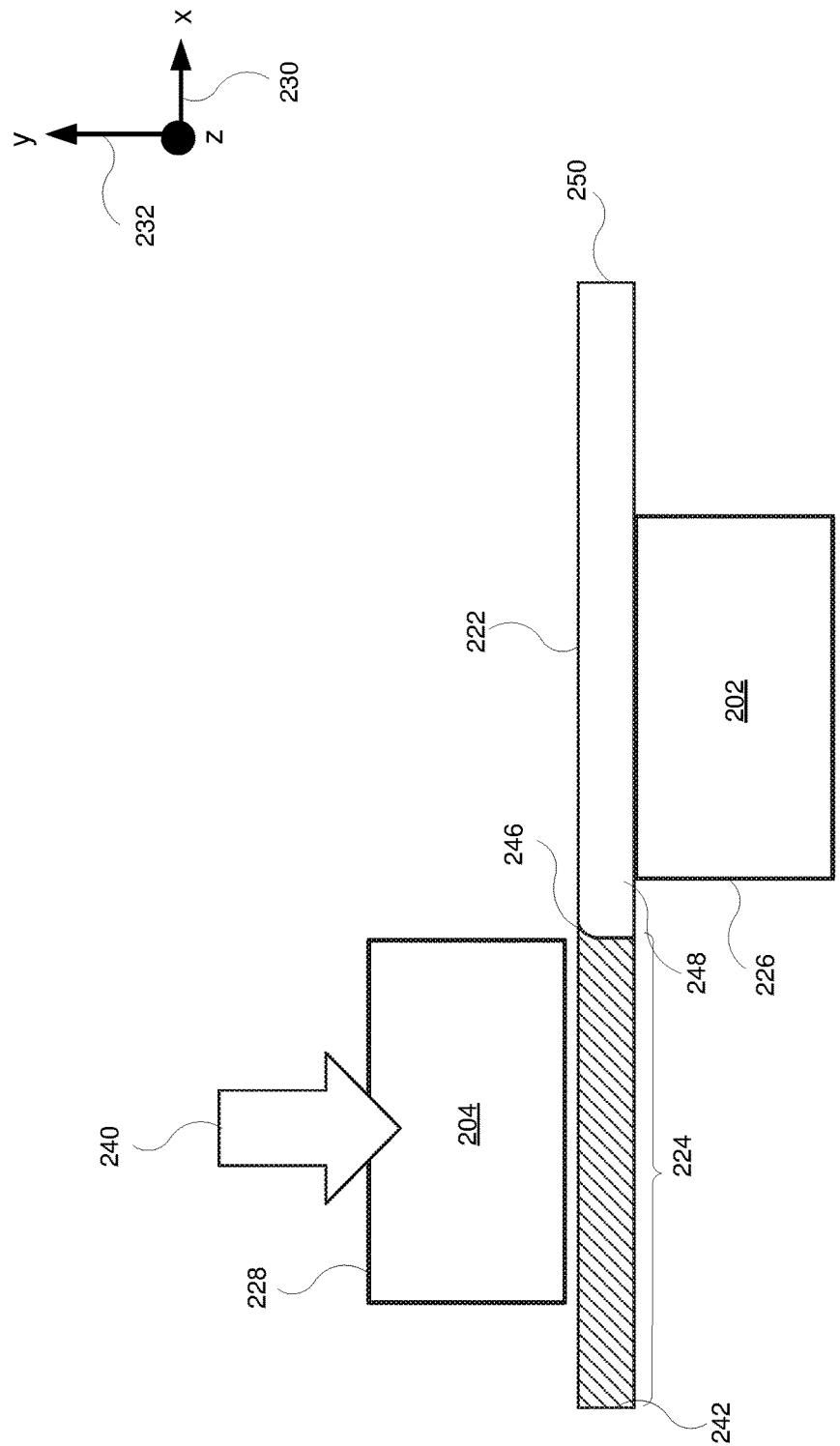
FIG. 2 is an illustration of an example use of an end-shaping tool to shape an end of a strap.

FIG. 2 is an illustration of an example use of an end-shaping tool to shape an end 224 of a strap 222. For example, the strap 222 may be the first piece of fabric 108 as shown in FIGS. 1A and 1B. The end-shaping tool may include a first portion 202 and a second portion 204.

The straps discussed herein may be reshaped by an end-shaping tool such that a cut, frayed end of the strap may be bent down with respect to a plane of the strap. As shown in the example in FIG. 2, the end 224 of the strap 222 may extend over a part of the first portion 202 of the end-shaping tool such that an inner location 248 of the strap 222 is in substantial alignment with a first portion edge 226 of the first portion 202. The inner location 248 of the strap 222 may be identified as a location on the strap 222 where a bending, folding, or reshaping of the strap 222 may start. The end 224 of the strap 222 may include an outer edge 242 (e.g., the cut end 122). In some implementations, the outer edge 242 may be a cut end that is frayed (e.g., the fraying 120 of the cut end 122). A plane of the strap may be parallel or substantially parallel to an x axis 230. Applying a force 240 (represented by arrow 240) to a part of the second portion 204 (e.g., a top edge 228 of the second portion 204) in a direction perpendicular to the plane of the strap 222 (e.g., applying the force in a direction parallel to a y axis 232 and perpendicular to the x axis 230) may cause the end 224 to bend at a location 246, folding the end 224 over the first portion edge 226 of the first portion 202 of the end-shaping tool. The bending of the end 224 of the strap 222 may reshape the end 224 of the strap 222. The end 224 of the strap 222 may bend at approximately a 45 to 90-degree angle (or any other suitable angle) with respect to the plane of the strap 222, as will be shown in more detail, for example, in FIGS. 5A and 5B. The end-shaping tool may fold down (i.e., bend) the end 224 of the strap 222 (e.g., the cut end 122) while reshaping the end 224 of the strap 222. The strap 222 may further include another end 250 that may be placed and formed by the end-shaping tool in a manner similar to the procedure discussed herein for forming the end 224.

Figure 3:
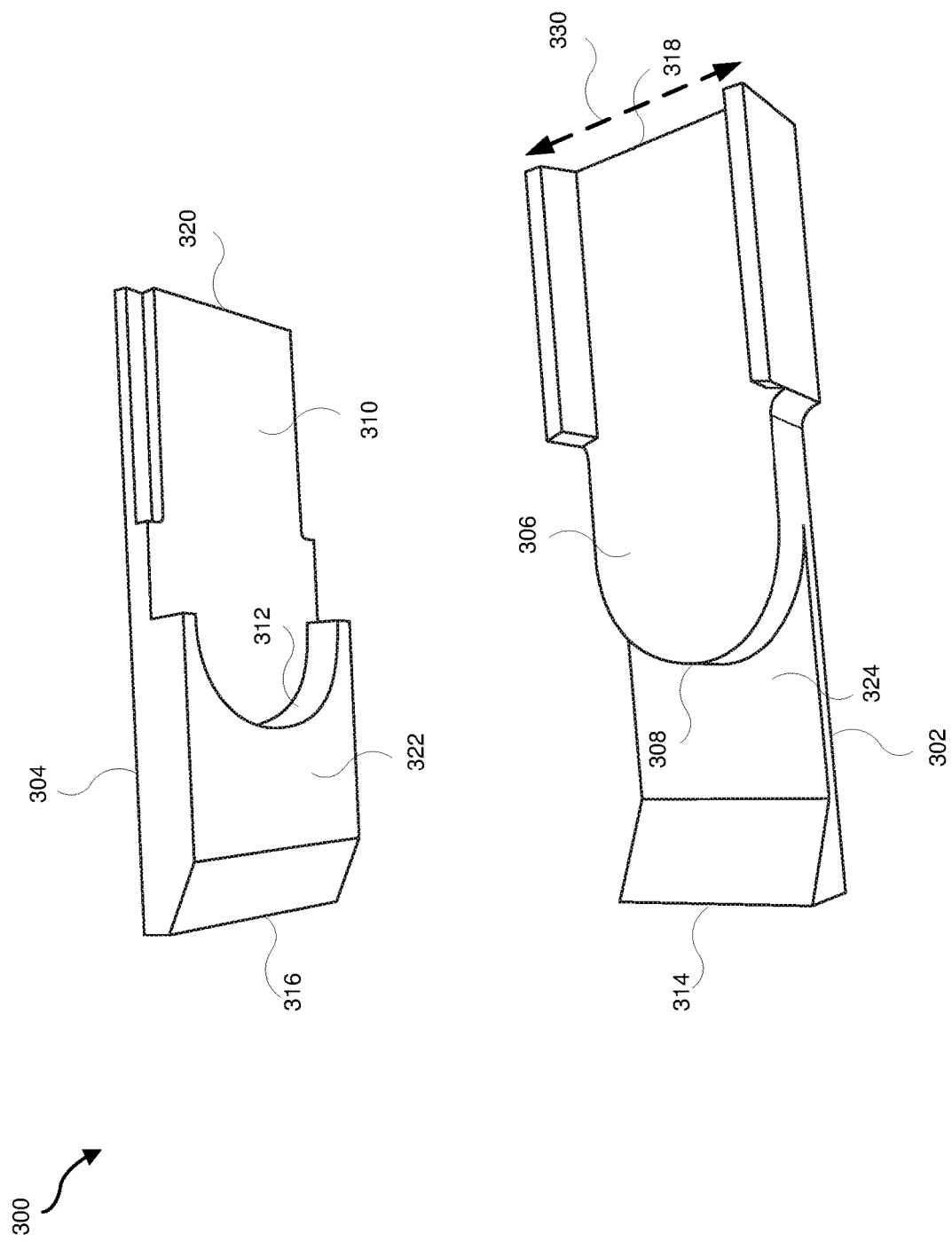
FIG. 3 is an illustration of parts of an example implementation of an end-shaping tool.

FIG. 3 is an illustration of parts of an example implementation of an end-shaping tool 300. The example end-shaping tool 300 may include a first portion 302 and a second portion 304. The first portion 302 may include a raised area 306 that has a raised edge 308. The second portion 304 may include a recessed area 310 that includes a recessed edge 312.

A strap as discussed herein may be positioned or placed in the end-shaping tool 300 such that an end of the strap may be bent or folded down by the end-shaping tool 300. As will be described with reference to FIG. 3, an end of a strap may be folded down by positioning the strap in a certain manner on the first portion 302 of the end-shaping tool 300 and then positioning the second portion 304 of the end-shaping tool 300 on top of the first portion 302.

The strap 222 may be positioned on the first portion 302 of the end-shaping tool 300. Referring to FIGS. 1A, 1B, and 2, the strap 222 may be dimensioned such that the width 124 of the strap 222 allows the strap 222 to be positioned or placed on the raised area 306 of the first portion 302 of the end-shaping tool 300 such that the end 224 of the strap 222 extends beyond the raised area 306, positioning or placing a location on the strap where a bend, folding, or reshaping of the strap may begin (e.g., an inner location 248 of the strap 222) in substantial alignment with the raised edge 308. In some implementations, such positioning or placement of the strap 222 on the first portion 302 of the end-shaping tool 300 may result in the outer edge 242 of the strap 222 (e.g., the cut end 122) overhanging a front end 314 of the first portion 302 of the end-shaping tool 300. The other end 250 of the strap 222 may overhang a back end 318 of the first portion 302 of the end-shaping tool 300.

The second portion 304 of the end-shaping tool 300 may be positioned on top of the first portion 302. Positioning the second portion 304 on or on top of the first portion 302 may encase a portion of the strap 222, providing a folding or bending of the strap 222 at a location on the strap 222 (e.g., the location 246) that substantially aligns with the raised edge 308. The second portion 304 may include a front end 316 and a back end 320. The recessed area 310 of the second portion 304 may be dimensioned or otherwise configured to accommodate the raised area 306 of the first portion 302 when the second portion 304 is positioned on or on top of the first portion 302. In addition, or in the alternative, a raised area 322 of the second portion 304 may be dimensioned or otherwise configured to accommodate a recessed area 324 of the first portion 302 when the second portion 304 is positioned on or on top of the first portion 302. A force (e.g., the force 240) applied to a top edge of the second portion 304 when the second portion 304 is positioned on the first portion 302 may cause the strap 222 to bend, fold, or otherwise be reshaped at a location on the strap that substantially aligns with the raised edge 308.

Though FIG. 3 shows an example end-shaping tool 300 that includes a semi-circular raised edge 308 that aligns with a semi-circular recessed edge 312, resulting in a bending of the strap in a semi-circle, the raised edge may be any other suitable shape or geometry. In some implementations, a square raised edge of a first portion of an end-shaping tool may align with a square recessed edge of a second portion of an end-shaping tool, resulting in a bending of the strap as a straight edge. In some implementations, a triangular raised edge of a first portion of an end-shaping tool may align with a triangular recessed edge of a second portion of an end-shaping tool, resulting in a bending of the strap as a triangular edge. Other implementations may include a raised edge of a first portion of a particular geometry and a recessed edge of a second portion that is of the particular geometry that results in a bending of a strap in end-shaping tool in the particular geometry.

Figure 4:
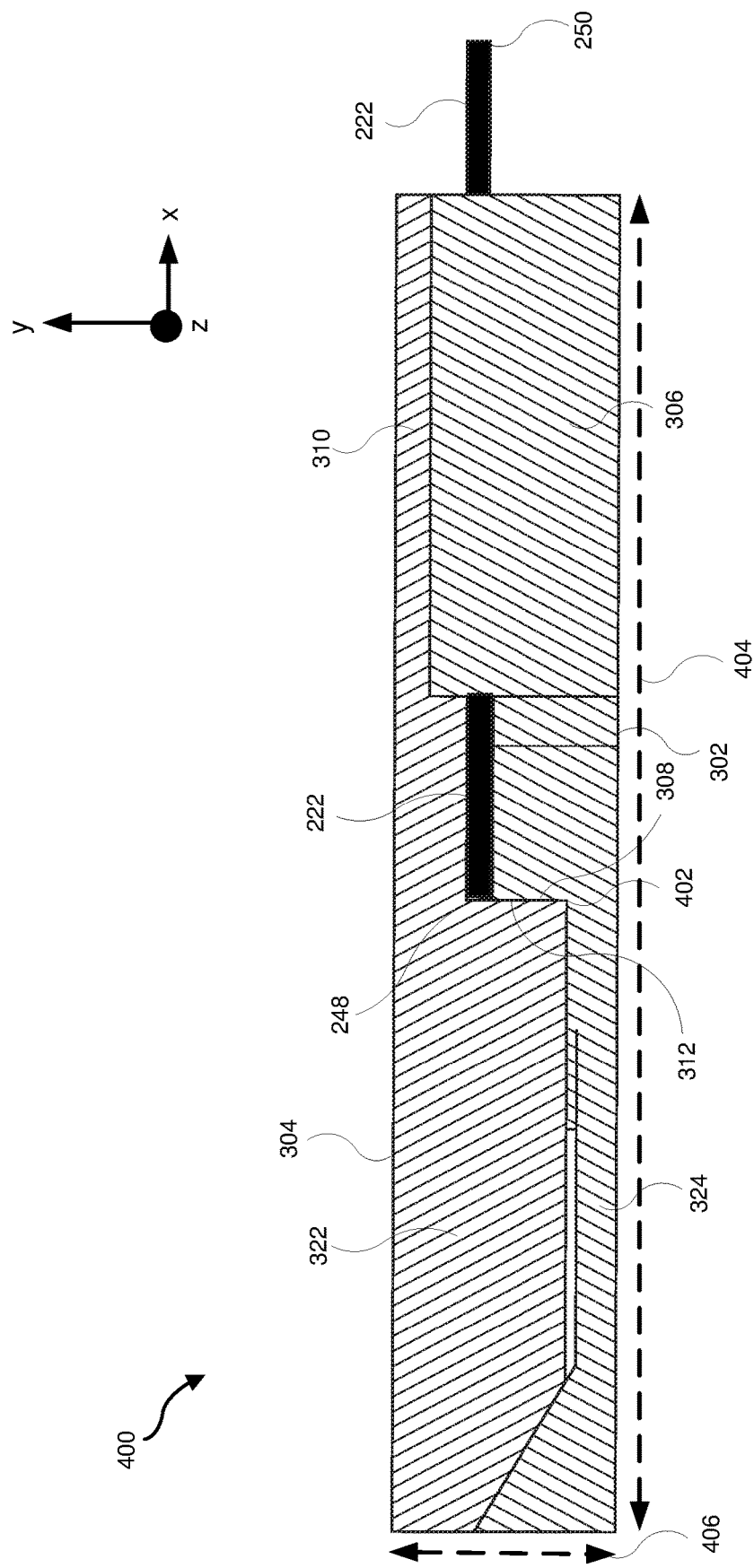
FIG. 4 is an illustration of a cross-sectional side view of an end-shaping tool with a second portion of the end-shaping tool positioned on a first portion of the end-shaping tool.

FIG. 4 is an illustration of a cross-sectional side view 400 of the end-shaping tool 300 with the second portion 304 positioned on (e.g., placed on top of) the first portion 302. Referring to FIGS. 2 and 3, the cross-sectional side view 400 of the end-shaping tool 300 shows the raised area 322 of the second portion 304 accommodating the recessed area 324 of the first portion 302. The cross-sectional side view 400 of the end-shaping tool 300 shows the recessed area 310 of the second portion 304 accommodating the raised area 306 of the first portion 302.

The cross-sectional side view 400 of the end-shaping tool 300 shows the strap 222 as placed in the end-shaping tool 300. The positioning of the second portion 304 on the first portion 302 may encase the strap 222. At a location 402, the inner location 248 of the strap 222 may be positioned substantially in alignment with the location of the overlapping of the recessed edge 312 of the second portion 304 with the raised edge 308 of the first portion 302. The inner location 248 of the strap 222 may be a location on the strap 222 where a bending, folding, or reshaping of the strap 222 may occur. Referring to FIGS. 3 and 4, for example, a length 404 of the end-shaping tool may be approximately 90-110 millimeters (mm). A height 406 of the end-shaping tool may be approximately 15-25 mm. And a width 330 of the end-shaping tool may be approximately 30-40 mm. The end-shaping tool may also have any other suitable dimensions.

Figure 5A:
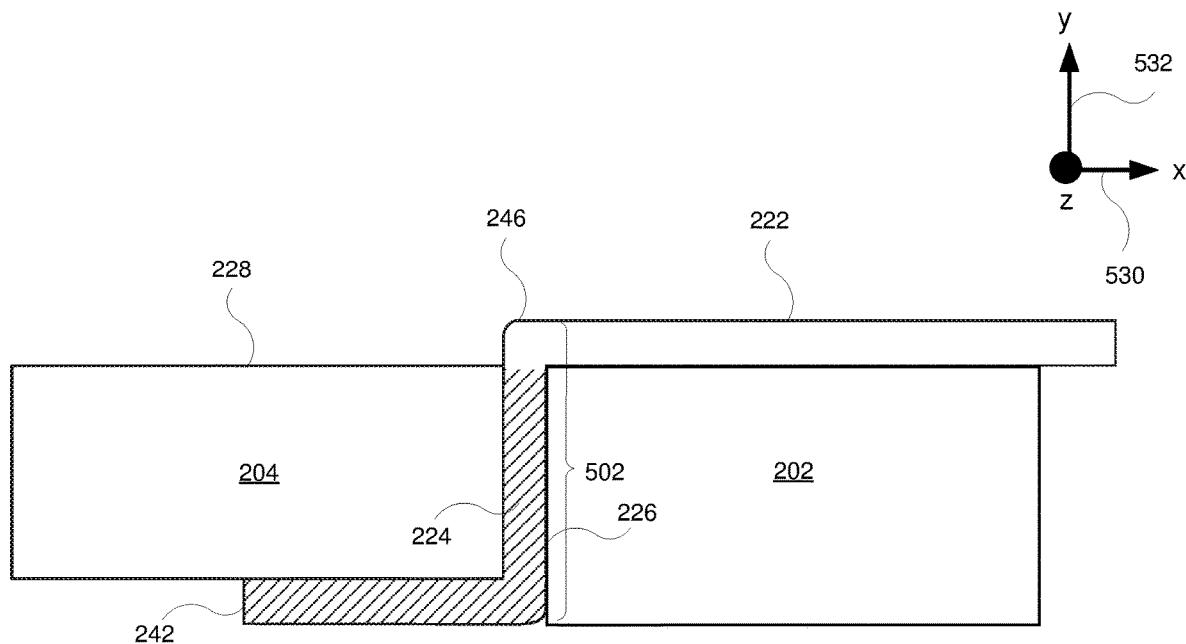
FIG. 5A is an illustration showing a shape of an end of a strap after being placed in an end-shaping tool.

FIG. 5A is an illustration showing a shape of an end of a strap (e.g., the end 224 of the strap 222 as shown in FIG. 2) after being placed in an end-shaping tool (e.g., the end-shaping tool 300 as shown in FIG. 3). Referring to FIGS. 2, 3, and 4, the force 240 applied to the top edge 228 of the second portion 204 of the end-shaping tool may bend the strap 222 at the location 246, causing the end 224 of the strap 222 to bend at the location 246 and folding the end 224 of the strap 222 along the first portion edge 226 of the first portion 202 of the end-shaping tool. This may cause the strap 222 to bend at the location 246 at substantially a 90-degree angle (e.g., an angle between approximately 85 degrees and 95 degrees) with respect to a plane of the strap 222, which is parallel to an x axis 530. The bent portion 502 of the strap 222 may be substantially perpendicular to a plane of the strap (e.g., parallel to a y axis 532, perpendicular to the x axis 530).

Figure 5B:
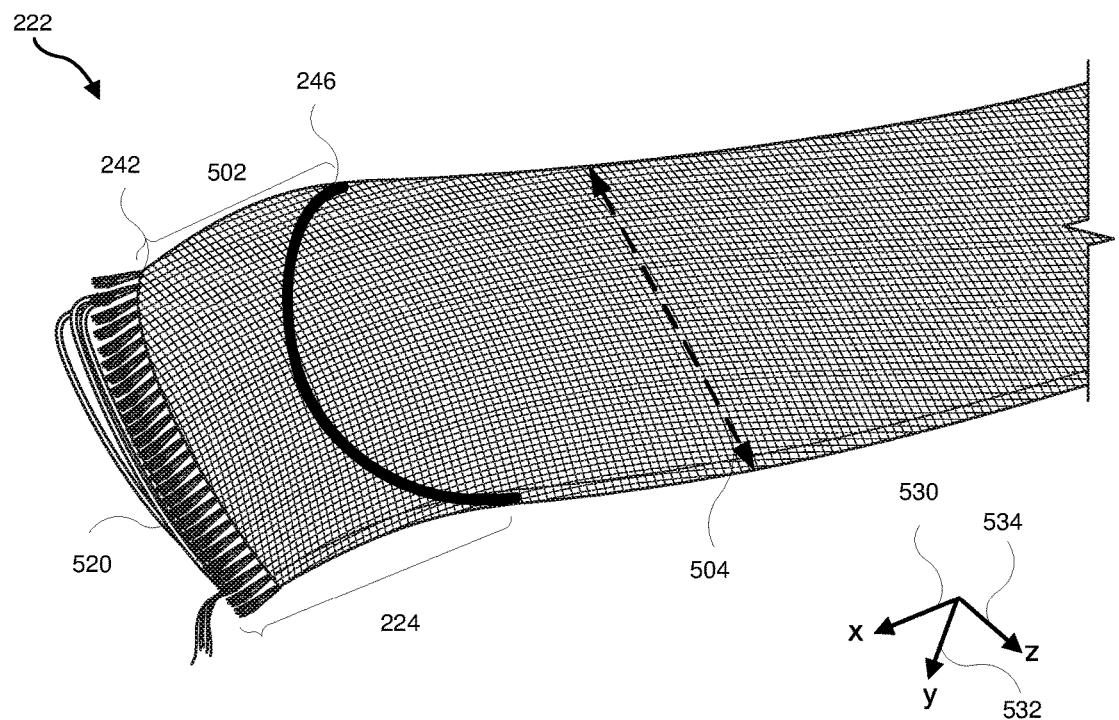
FIG. 5B is an illustration of an example strap after being placed in an end-shaping tool that heats an end of the strap.

FIG. 5B is an illustration of an example strap (e.g., the strap 222) after being placed in an end-shaping tool (e.g., the end-shaping tool 300) and after heating the end 224 of the strap 222 and setting the fibers in all or a portion of the bent portion 502 of the strap 222. The end 224 of the strap 222 may be folded or bent at the location 246, thereby bending down the outer edge 242 that may be a cut end of the strap 222 that is frayed (e.g., frayed end 520). The end 224 of the strap 222 may be bent at an angle relative to a plane of the strap 222. For example, the frayed end 520 may be folded down so that the end 224 of the strap 222 may be further processed to form a strap end that is finished and not frayed. In some implementations, the strap 222 may include another end, similar to the end 224, that may be placed in an end-shaping tool (e.g., the end-shaping tool 300).

Subsequent to the bending of an end of a strap, an end-shaping tool (e.g., the end-shaping tool 300 as shown in FIG. 3) may heat all or a portion of the bent area of the strap at a temperature that may set the fibers in the strap in the bent area, applying the heat along a plane of the fibers. In some implementations, referring to FIG. 3, and FIGS. 5A-B, the second portion 304 of the end-shaping tool 300 may heat a portion of the strap 222 at the bend in the strap 222. In some implementations, referring to FIGS. 3 and 4, the second portion 304 of the end-shaping tool 300 may heat the end 224 of the strap 222 at the raised area 322 of the second portion 304 of the end-shaping tool 300. The heat may be applied to the end 224 of the strap at the recessed edge 312 at a temperature (e.g., 210 degrees Celsius to 270 degrees Celsius) that may set fibers in the bent portion 502 of the strap 222. The recessed edge 312 may apply the heat to the fibers of the strap included in the bent portion 502 of the strap 222 along the plane of the fibers (e.g., parallel to the x axis 530) in a direction along a width 504 of the strap 222 (e.g., a direction parallel to a z axis 534). Additionally, or alternatively, the first portion 302 of the end-shaping tool 300 may heat the end 224 of the strap 222 at the raised area 306 of the first portion 302 of the end-shaping tool 300. The heat may be applied to the end 224 of the strap 222 at the raised edge 308 at a temperature that may set fibers in the bent portion 502 of the strap. The raised edge 308 may apply the heat along the fibers of the strap (e.g., parallel to the x axis 530) included in the bent portion 502 of the strap 222 in a direction along the width 504 of the strap 222 (e.g., a direction parallel to the z axis 534).

Figure 6:
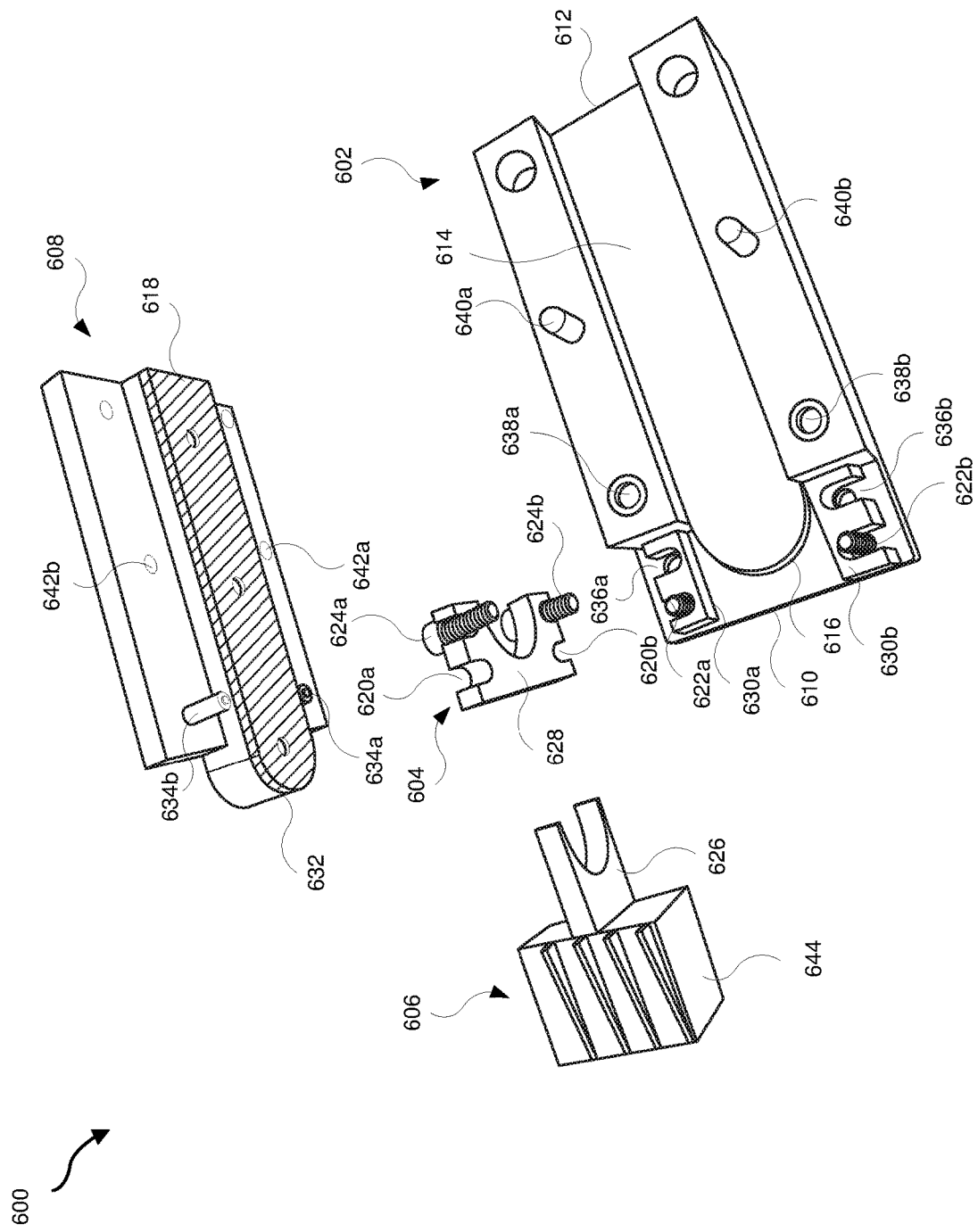
FIG. 6 is an illustration of parts of an example end-setting tool.

FIG. 6 is an illustration of parts of an example end-setting tool 600. Subsequent to placing the strap in an end-shaping tool (e.g., the end-shaping tool 300), the strap 222, which may now include one or more bent portions (e.g., bent portion 502), may be positioned or placed in the end-setting tool 600. The end-setting tool 600 may deboss the strap 222 at the bent portion 502.

The end-setting tool 600 may include multiple parts that, when assembled, may allow the end-setting tool 600 to be used for debossing a bent end of a strap. Though described in a particular order when referencing FIG. 6, the debossing of a bent end of a strap by the end-setting tool 600 may be performed in an order different than that described below. The end-setting tool 600 may include a fixture base 602, a fixture insulator 604, a debossing tool 606, and a fixture top 608. The fixture base 602 may include a front end 610 and a back end 612. The fixture base 602 may include a raised portion 614 that may include a rounded end 616. The fixture top 608 may include an insulator strip 618.

Debossing a bent end of a strap may include positioning the bent end of the strap on the fixture base 602 of the end-setting tool 600. A bent, shaped end of a strap (e.g., the bent portion 502 of the strap 222 as shown in FIGS. 5A-B), may be positioned or placed in the fixture base 602 with the bent portion 502 positioned over the rounded end 616. In some implementations, another end of the strap 222 may protrude from the back end 612 of the fixture base 602.

After positioning the bent end of the strap on the fixture base 602, the fixture insulator 604 may be positioned or placed at the front end 610 of the fixture base 602. The fixture insulator 604 may be attached, secured, or connected to the fixture base 602 by placing insulator grooves 620a-b over and around fixture screws 622a-b, respectively, and then by securing insulator screws 624a-b into respective holes 626a-b. For example, the fixture screws 622a-b may be thumb screws. The holes 636a-b may be predrilled and tapped to accommodate the respective fixture screws 622a-b.

After positioning the fixture insulator 604 at the front end 610 of the fixture base 602, the debossing tool 606 may be placed around the rounded end of the strap that overhangs the rounded end 616 of the fixture base 602. The debossing tool 606 may include a front portion 626 and a rear portion 644. The front portion 626 of the debossing tool 606 may be placed between the front end 610 of the fixture base 602 and a bottom 628 of the fixture insulator 604. Risers 630a-b are dimensioned to accommodate positioning or placing of the front portion 626 of the debossing tool 606 between the front end 610 of the fixture base 602 and a bottom 628 of the fixture insulator 604 when the fixture insulator 604 is attached, secured, or connected to the fixture base 602 as described herein. In some implementations, the fixture insulator 604 may insulate a small portion of the strap 222 proximate to the location 246 of the bend in the strap. As such, a deboss region of the strap 222 may begin below the location 246 and below the small insulated portion of the strap 222 proximate to the location 246.

When the fixture top 608 is positioned or placed over (on top of) the fixture base 602, the end-setting tool 600 may partially encase an end of a strap. The fixture top 608 may include one or more parts or components that may be connected to or interfaced with one or more parts or components included on the fixture base 602. The fixture top 608 may include an insulator strip 618. The fixture top 608 may be positioned on or placed over (on top of) the fixture base 602 with fixture top pins 634a-b fitting into (positioned in or placed in) respective fixture base holes 638a-b and, in addition or in the alternative, with fixture bottom pins 640a-b fitting into (positioned in or placed in) respective fixture base holes 642a-b. When the fixture top 608 is positioned on the fixture base 602, a front end 632 of the fixture top 608 may be aligned over the front end 610 of the fixture base 602 partially encasing an end of a strap. The insulator strip 618 may insulate a part of the strap that is included in the end-setting tool 600 but that does not overhang the rounded end 616 of the fixture base 602.

With the fixture top 608 positioned on the fixture base 602, the deboss tool 606 may heat all or a portion of the bent area of the strap at a temperature that may melt the fibers in the strap in the bent area. When the front portion 626 of the debossing tool 606 is positioned around an end of a strap that overhangs the rounded end 616 of the fixture base 602, heat applied by the debossing tool 606 to the front portion 626 may melt the fibers (e.g., yarns) in a portion of the strap that overhangs the rounded end 616 of the fixture base 602 and that contacts the front portion 626. For example, referring to FIGS. 5A-B, the bent portion 502 of the strap 222 may be positioned on the rounded end 616 such that the end 224 hangs over the rounded end 616. The debossing tool 606 may deboss the portion of the end of the strap at the bent portion 502 of the strap 222 that contacts the front portion 626 by heating the portion of the end of the strap along the bent portion 502.

Figure 7:
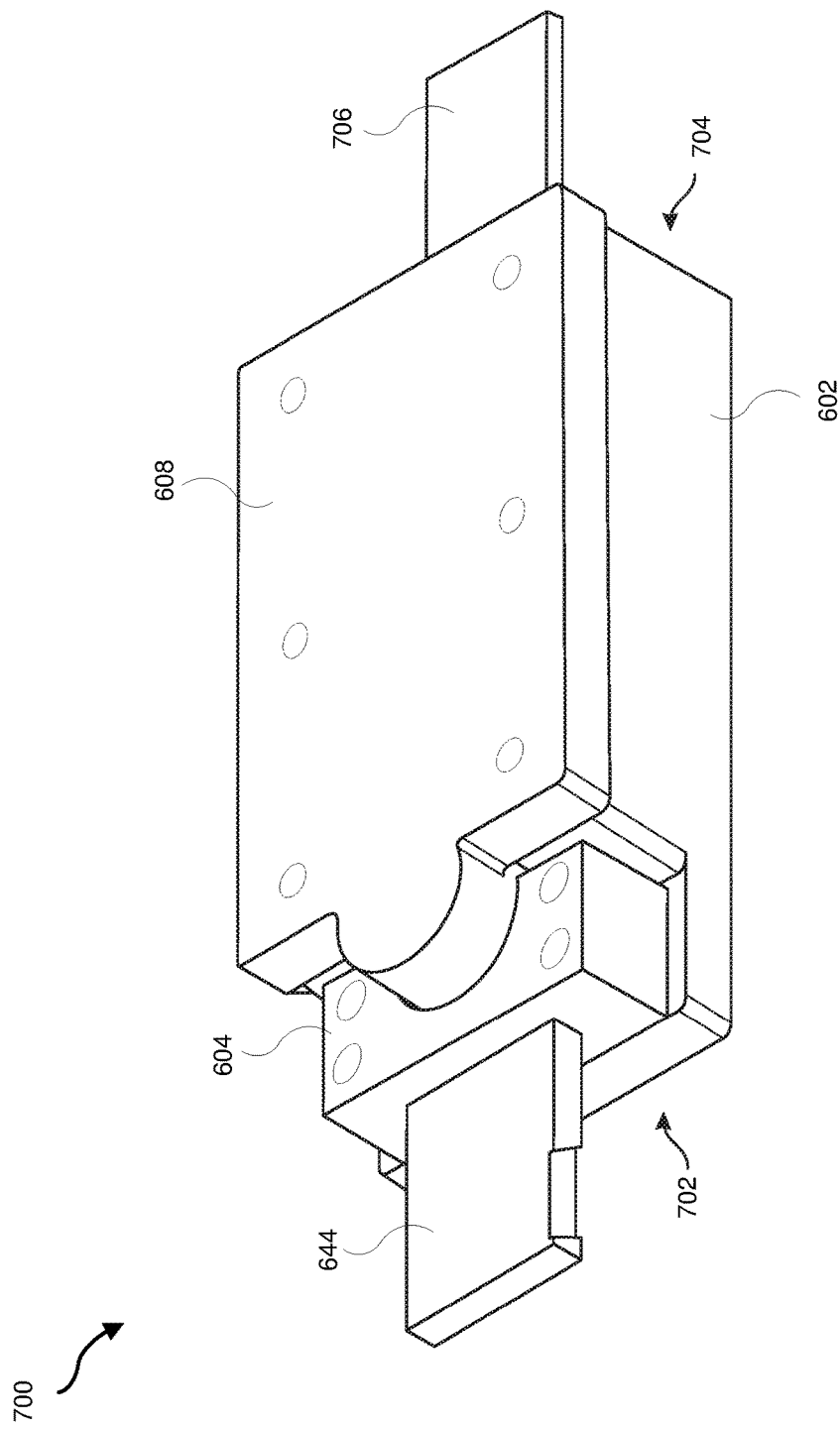
FIG. 7 is an illustration of a perspective view of an example end-setting tool.
Figure 8:
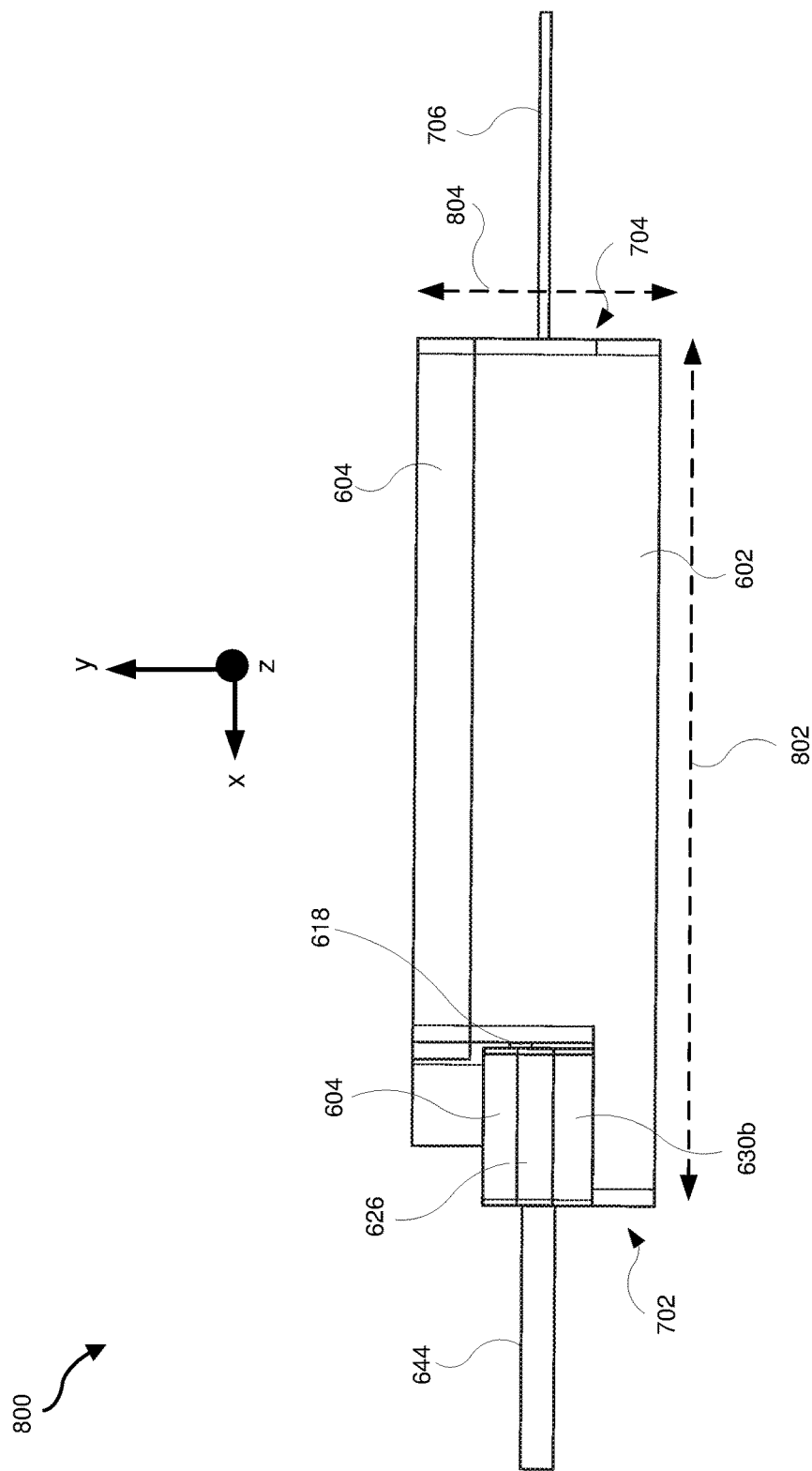
FIG. 8 is an illustration of another perspective view of the example end-setting tool shown in FIG. 6.
Figure 9:
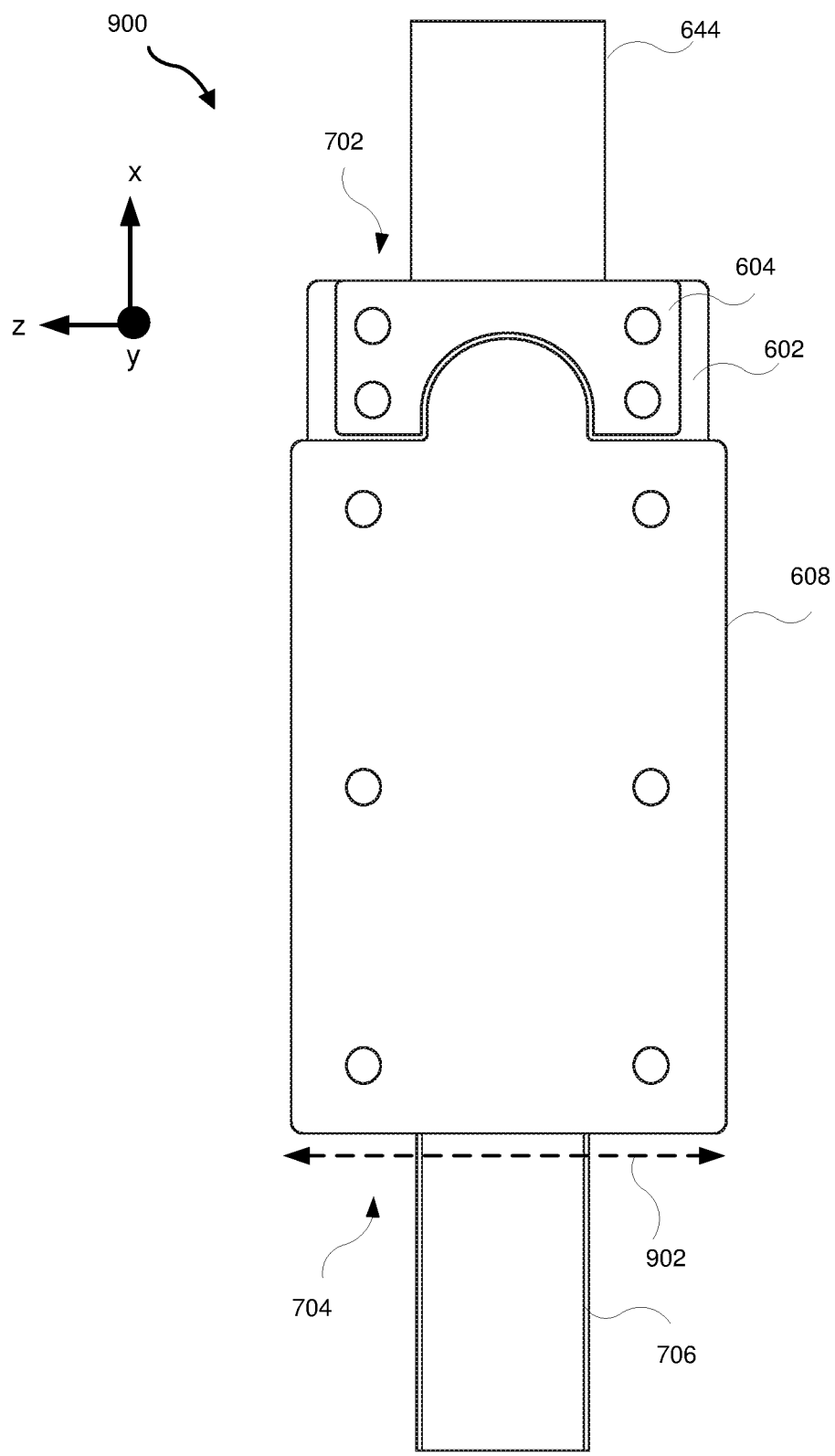
FIG. 9 is an illustration of another perspective view of the example end-setting tool shown in FIG. 6.

FIGS. 7-9 are illustrations of multiple views or aspects of an assembled end-setting tool. For example, FIGS. 7-9 may illustrate multiple views of the end-setting tool 600 as assembled with the fixture top 608 positioned on top of the fixture base 602, the fixture insulator 604 attached to the fixture base 602, and the front portion 626 of the debossing tool 606 positioned between the front end 610 of the fixture base 602 and the bottom 628 of the fixture insulator 604.

FIG. 7 is an illustration of a view 700 of the example end-setting tool 600 when the fixture top 608 is positioned on (attached to) the fixture base 602. Referring also to FIG. 6, the view 700 shows the fixture insulator 604 attached to the fixture base 602. The view 700 shows the rear portion 644 of the debossing tool 606. The view 700 shows a front 702 of the end-setting tool 600 and a rear 704 of the end-setting tool 600. A second end of the strap 222 (strap second end 706) is shown protruding out the rear 704 of the end-setting tool 600.

FIG. 8 is an illustration of a side view 800 of the example end-setting tool 600 when the fixture top 608 is positioned on (attached to) the fixture base 602. Referring also to FIGS. 6 and 7, the side view 800 shows a side view of the fixture insulator 604 attached to the fixture base 602. The side view 800 shows a side view of the rear portion 644 of the debossing tool 606. The side view 800 shows a side view of the second end of the strap 222 (strap second end 706) protruding out of the rear 704 of the end-setting tool 600. The side view 800 shows a side view of the riser 630b, a side view of the front portion 626 of the debossing tool 606, and a side view of the fixture insulator 604.

FIG. 9 is an illustration of a top view 900 of the example end-setting tool 600 when the fixture top 608 is positioned on (attached to) the fixture base 602. Referring also to FIGS. 6 and 7, the top view 900 shows a top view of the fixture top 608. The top view 900 shows a top view of the fixture insulator 604. The top view 900 shows a top view of the rear portion 644 of the debossing tool 606. The top view 900 shows a top view of the second end of the strap 222 (strap second end 706) protruding out of the rear 704 of the end-setting tool 600.

Referring to FIGS. 6-9, the end-setting tool 600 may have any suitable dimensions. For example, a length 802 of the end-setting tool 600 may be approximately 150-160 millimeters (mm). A height 804 of the end-setting tool 600 may be approximately 35-45 mm. A width 902 of the end-setting tool 600 may be approximately 75-85 mm.

Figure 10A:
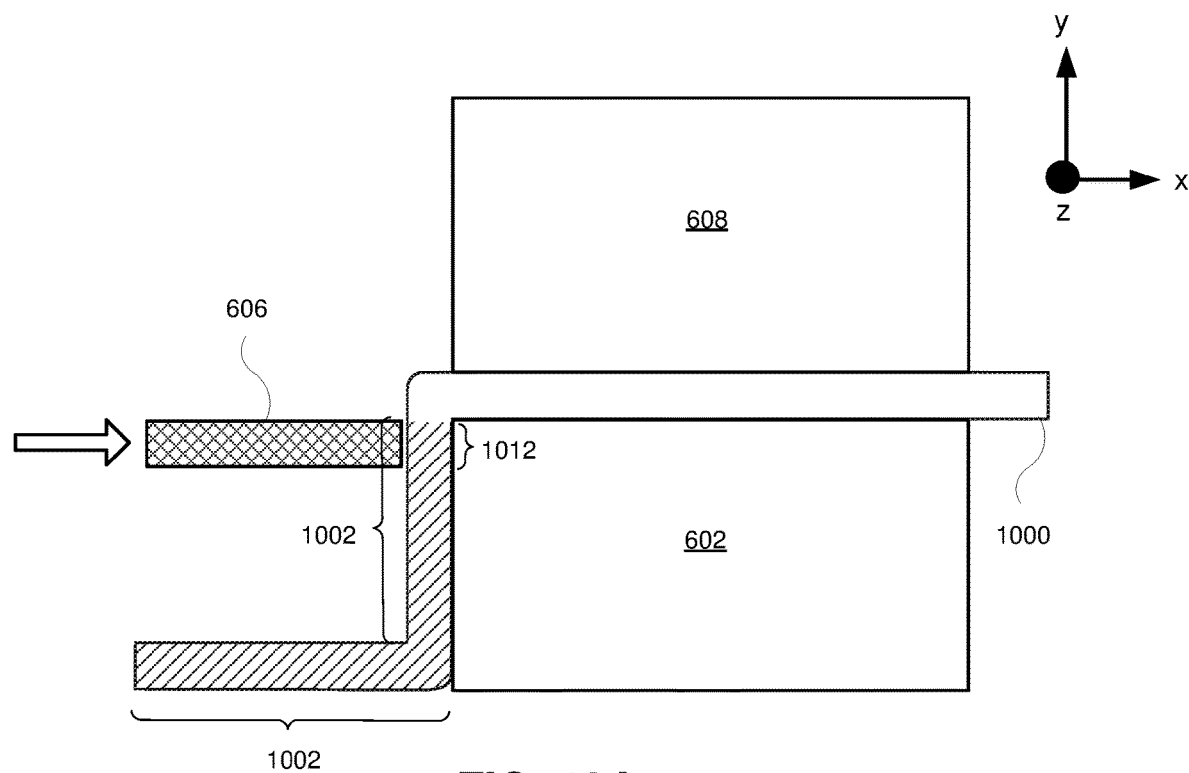
FIG. 10A is an illustration of an exemplary debossing of a strap while positioned in an end setting tool.

FIG. 10A is an illustration of an example debossing of a strap while positioned in an end setting tool. Referring to FIGS. 6 and 10, an end-setting tool (e.g., the end-setting tool 600) may deboss a portion of an end of a strap (e.g., end 1002 of strap 1000) in a deboss region or area (e.g., deboss region 1012). The end 1002 of the strap 1000 may be positioned on the fixture base 602 such that the end is folded over the fixture base 602. The fixture top 608 may be positioned over or on top of the fixture base 602. The deboss tool 606 may be placed in the end-setting tool 600 debossing a portion of the end 1002 of the strap 1000 in the deboss region 1012.

Figure 10B:
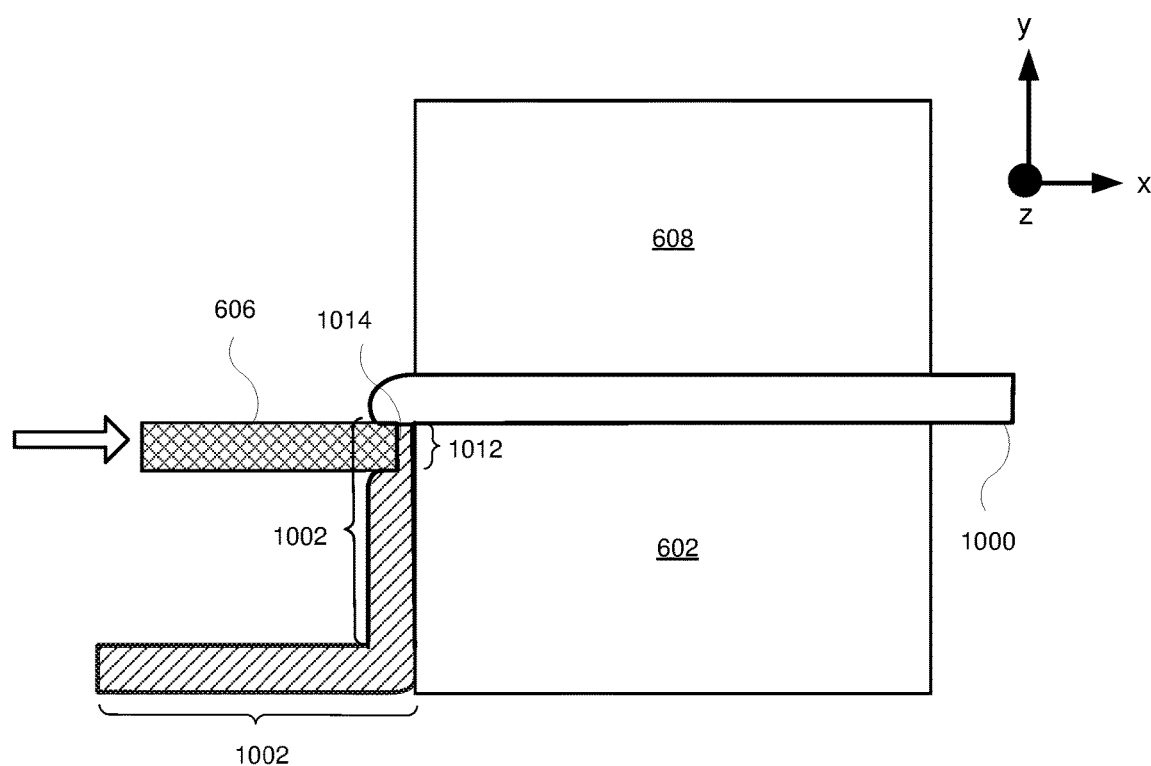
FIG. 10B is an illustration of an exemplary debossing of a strap while positioned in an end setting tool where the debossing forms an indent in an end of the strap

FIG. 10B is an illustration of an example debossing of a strap while positioned in an end setting tool where the debossing forms an indent in an end of the strap. Referring to FIGS. 6 and 10, an end-setting tool (e.g., the end-setting tool 600) may deboss a portion of an end of a strap (e.g., the end 1002 of the strap 1000) in a deboss region or area (e.g., the deboss region 1012). The deboss region 1012 may form an indent 1014 in a portion of the folded end 1002 of the strap 1000.

Figure 11:
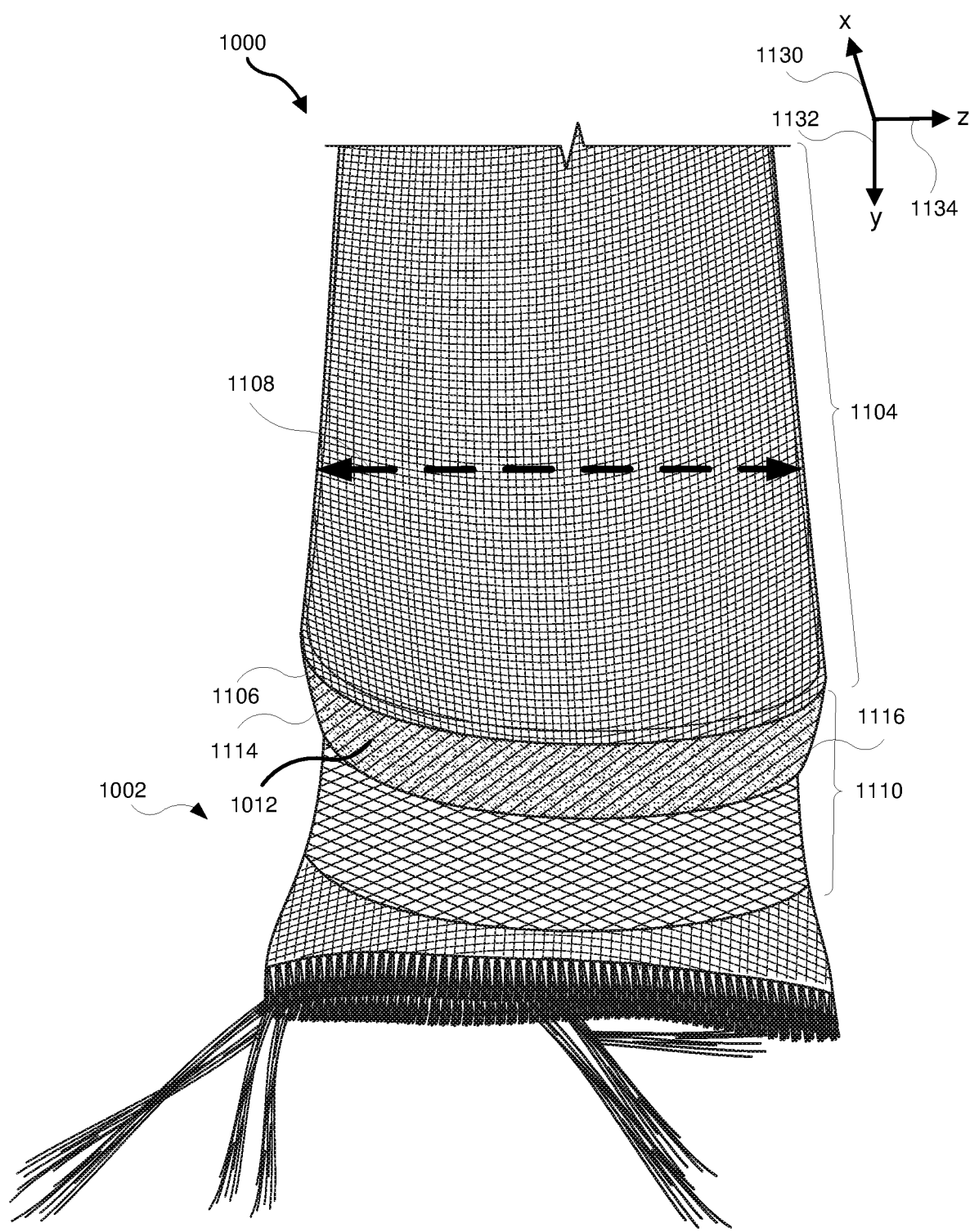
FIG. 11 is an illustration of an example end of a strap after being placed in an end-shaping tool and then into an end-setting tool.

FIG. 11 is an illustration of the example end 1002 of the strap 1000 after being placed in an end-shaping tool (e.g., the end-shaping tool 300) and then into an end-setting tool (e.g., the end-setting tool 600). For example, referring also to FIG. 10, the end 1002 of the strap 1000 may be the end 224 of the strap 222 after being placed in the end-shaping tool 300 and then into the end-setting tool 600. For example, as a result of the placement of the end 1002 of the strap 1000 in an end shaping tool (e.g., the end-shaping tool 300), the end 1002 of the strap 1000 may be bent or folded at a location 1106 along the strap 1000.

An end-shaping tool (e.g., the end-shaping tool 300 as described with reference to FIG. 3) may bend an end of a strap. For example, the bend or fold in the strap 1000 may be approximately along a width 1108 of the strap 1000. The width 1108 of the strap 1000 may be along (parallel to) a z axis 1134. The end-shaping tool (e.g., the end-shaping tool 300) may bend the end 1002 of the strap 1000 in a direction perpendicular to the plane of the strap (e.g., in a direction along a y axis 1132 where the plane of the strap 1000 is along an x axis 1130).

An end-shaping tool (e.g., the end-shaping tool 300 as described with reference to FIG. 3) may heat a portion of the end 1002 of the strap 1000 at the bend (e.g., the location 1106), setting the fibers in the end 1002 of the strap 1000 producing the heated strap portion 1110. For example, referring to FIG. 3, the second portion 304 of the end-shaping tool 300 may apply heat to all or a portion of the end 1002 of the strap 1000 at the bend (e.g., the location 1106) resulting in, for example, the heated strap portion 1110. In some implementations, the second portion 304 of the end-shaping tool 300 may apply heat to all or a portion of the end 1002 of the strap 1000 at the bend (e.g., the location 1106) at the raised area 322 of the second portion 304 of the end-shaping tool 300. The heat may be applied at a temperature that may set fibers in the end 1002 of the strap 1000 as described with reference to FIG. 5. The recessed edge 312 may apply the heat along the fibers of the strap (e.g., parallel to the x axis 1130) included in the end 1002 of the strap 1000 in a direction along the width 1108 of the strap 1000 (e.g., parallel to the z axis 1134). Additionally, or alternatively, the first portion 302 of the end-shaping tool 300 may heat the end 1002 of the strap 1000 at the raised area 306 of the first portion 302 of the end-shaping tool 300. The heat may be applied to the end 1002 of the strap 1000 at the raised edge 308 at a temperature that may set fibers in the bent portion of the end 1002 of the strap 1000. The raised edge 308 may apply the heat along the fibers of the strap (e.g., parallel to the x axis 1130) included in the heated strap portion 1110 of the strap 1000 in a direction parallel to the width 1108 of the strap 1000 (e.g., parallel to the z axis 1134).

Subsequent to the bending and setting of the end 1002 of the strap 1000 by an end-shaping tool (e.g., the end-shaping tool 300 as described with reference to FIG. 3), the strap 1000 may be positioned (placed) in an end-setting tool (e.g., the end-setting tool 600 as described with reference to FIG. 6) that may deboss the end 1002 of the strap 1000 in a portion of the heated strap portion 1110 (e.g., the deboss region 1012). For example, referring to FIG. 6, the strap 1000 may be positioned or placed in the end-setting tool 600 such that a first portion 1104 of the strap 1000 may be positioned on the raised portion 614 of the fixture base 602 while the end 1002 of the strap 1000 may be positioned on the rounded end 616 of the fixture base 602 so that the end 1002 of the strap 1000 overlays (is folded over) the rounded end 616 of the fixture base 602. Positioned as such, the deboss region 1012 may be contacted by the front portion 626 of the debossing tool 606. The front portion 626 of the debossing tool 606 may heat the deboss region 1012 to a temperature (e.g., 210 degrees Celsius to 270 degrees Celsius) that melts fibers in the strap at the deboss region 1012, debossing the portion of the end 1002 of the strap 1000 included in the deboss region 1012. In addition, positioning the first portion 1104 of the strap 1000 on the raised portion 614 of the fixture base 602 allows the first portion 1104 of the strap 1000 to contact the insulator strip 618 of the fixture top 608 when the fixture top 608 is positioned on the fixture base 602 as described herein. Such contact may insulate the first portion 1104 of the strap 1000 from the heat applied by the front portion 626 of the debossing tool 606.

Figure 12A:
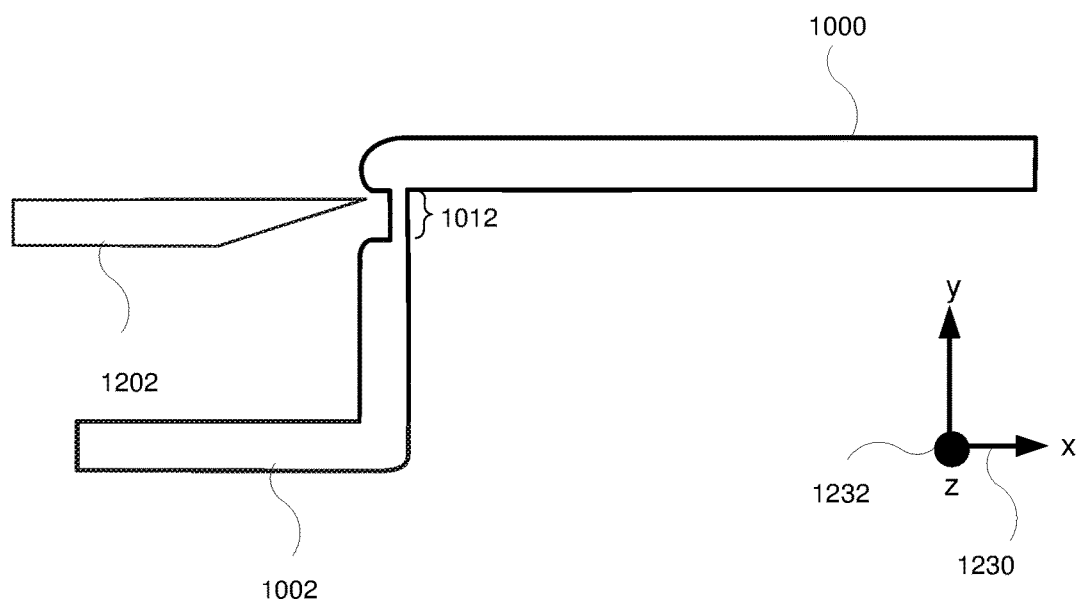
FIG. 12A is an illustration of an example of cutting a strap after the strap was placed in the end-shaping tool and the end-setting tool.

FIG. 12A is an illustration of an example of cutting a strap after the strap was placed in the end-shaping tool and the end-setting tool. Referring to FIGS. 6, 10A, 10B, and 11, subsequent to an end-setting tool (e.g., the end-setting tool 600) debossing a portion of an end of a strap (e.g., the end 1002 of the strap 1000 included in the deboss region 1012), a cutter 1202 may cut the end 1002 of the strap 1000 at the deboss region 1012. Examples of a cutter (e.g., the cutter 1202) may include, but are not limited to an ultrasonic cutter, a blade, or other type of cutter capable of cutting the end 1002 of the strap 1000 in the deboss region 1012.

Subsequent to the debossing of an end of a strap, in some implementations, an end-setting tool (e.g., the end-setting tool 600 as described with reference to FIG. 6) may include a cutter that may cut an end of a strap in a deboss region while the strap is inserted in the end-setting tool. Referring to FIGS. 11 and 12A, the cutter may cut the end 1002 of the strap 1000 in the deboss region 1012. In some implementations, the cutter may cut the end 1002 of the strap 1000 in the deboss region 1012 in a direction parallel to a plane of the strap (e.g., along an x axis 1230). For example, referring to FIGS. 6, 10A, and 10B, the debossing tool 606 included in the end-setting tool 600 may deboss the end 1002 of the strap 1000 in the deboss region 1012. A cutter may cut the end 1002 of the strap 1000 in the deboss region 1012 in a direction parallel to a plane of the strap (e.g., along the x axis 1230).

Concurrent with the debossing of an end of a strap, in some implementations, a cutter may cut along a debossed region of the strap in a same direction as the performing of the debossing of the end of the strap in the deboss region. Referring to FIGS. 6, 10A, 10B, and 11, an end-setting tool (e.g., the end-setting tool 600) may deboss the deboss region 1012 in a direction parallel to the width 1108 of the strap 1000 (e.g., along the z axis 1134). For example, a debossing tool 606 included in the end-setting tool 600 may deboss the end 1002 of the strap 1000 in the deboss region 1012. In some implementations, the cutter may cut the end 1002 of the strap 1000 in the deboss region 1012 starting at a first side 1114 of the end 1002 of the strap 1000 and ending at a second side 1116 of the end 1002 of the strap 1000. In some implementations, a cutter may cut the end 1002 of the strap 1000 in the deboss region 1012 starting at the second side 1116 of the end 1002 of the strap 1000 and ending at the first side 1114 of the end 1002 of the strap 1000.

Subsequent to the debossing of an end of a strap, in some implementations, referring to FIGS. 10A, 10B, and 11, the strap 1000 (and specifically the end 1002 of the strap 1000 after debossing) may be positioned or placed in a cutter separate from an end-setting tool. For example, the end 1002 of the strap 1000 including the deboss region 1012 may be positioned or placed in an ultrasonic or other type of cutter that cuts the end 1002 of the strap 1000 along the deboss region 1012 in a direction that is parallel to the plane of the strap 1000 (parallel to the x axis 1230). In some implementations, the end 1002 of the strap 1000 may be cut by hand (e.g., a user using a scissor) along the deboss region 1012 in a direction that is parallel to the width 1108 of the strap 1000 (parallel to the z axis 1232).

Figure 12B:
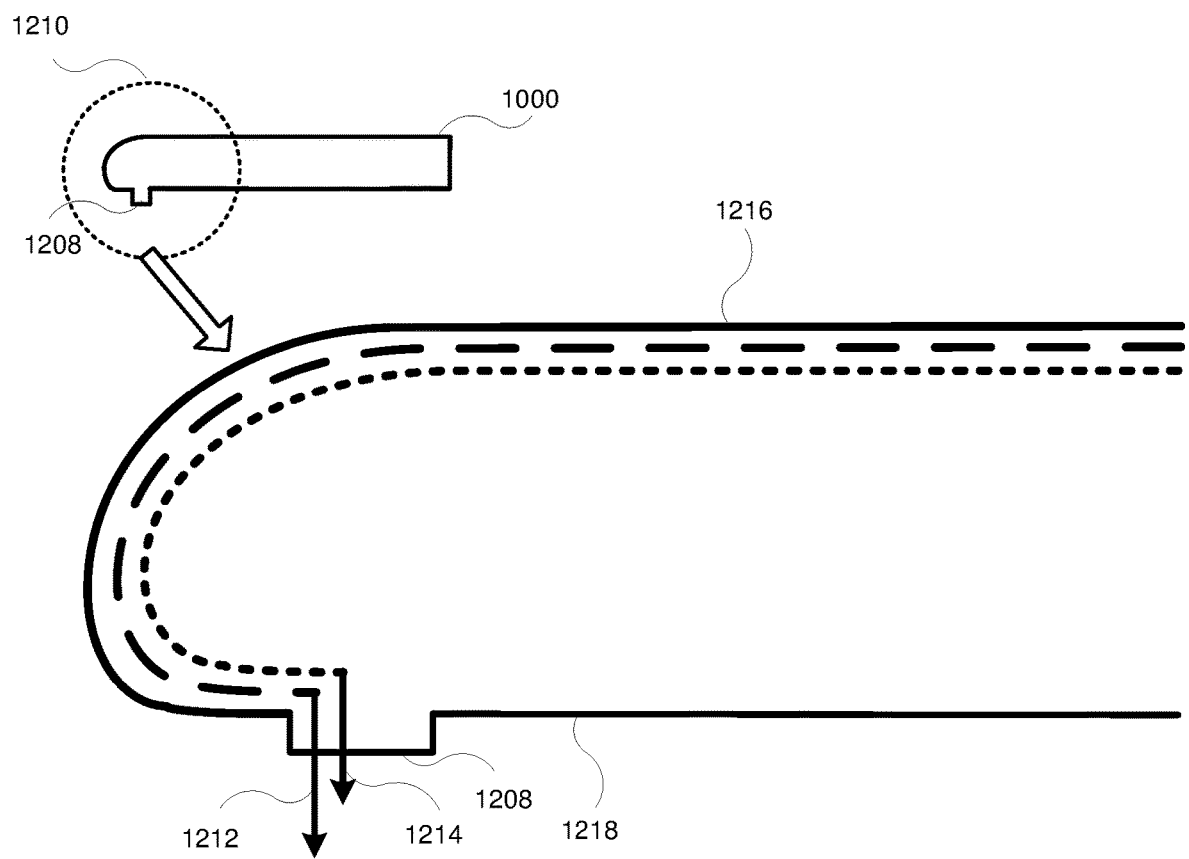
FIG. 12B is an illustration of an example debossed and cut end of a strap.

FIG. 12B is an illustration of an example debossed and cut end of a strap. Referring also to FIGS. 10A, 10B, 11, and 12A, the strap 1000 may be debossed in the deboss region 1012 and then cut by the cutter 1202 in the deboss region 1012. The result may be a strap end 1210 that includes a debossed cut end 1208 that may be folded under a top 1216 of the strap end 1210 providing a finished end to the strap end 1210.

A direction of the cutting of the debossed end of the strap as described herein may be in a direction to encourage the ends of the fibers or yarns of the strap to fold and wrap around an end of a strap. Arrow 1212 and arrow 1214 indicate a direction of the folding and bending of the strands of yarn or fibers included in the strap end 1210 as a result of the cutting of the debossed end of the strap as shown in, for example, FIG. 12A. Bending the strands of yarn or the fibers around from the top 1216 of the strap end 1210 to a back 1218 of the strap end 1210, setting the bent end of the strap 1000, and then directionally cutting the strap 1000 in the deboss region 1012 may encourage the placement of the debossed cut end 1208 on the back 1218 of the strap end 1210 and under the strap 1000.

Figure 13:
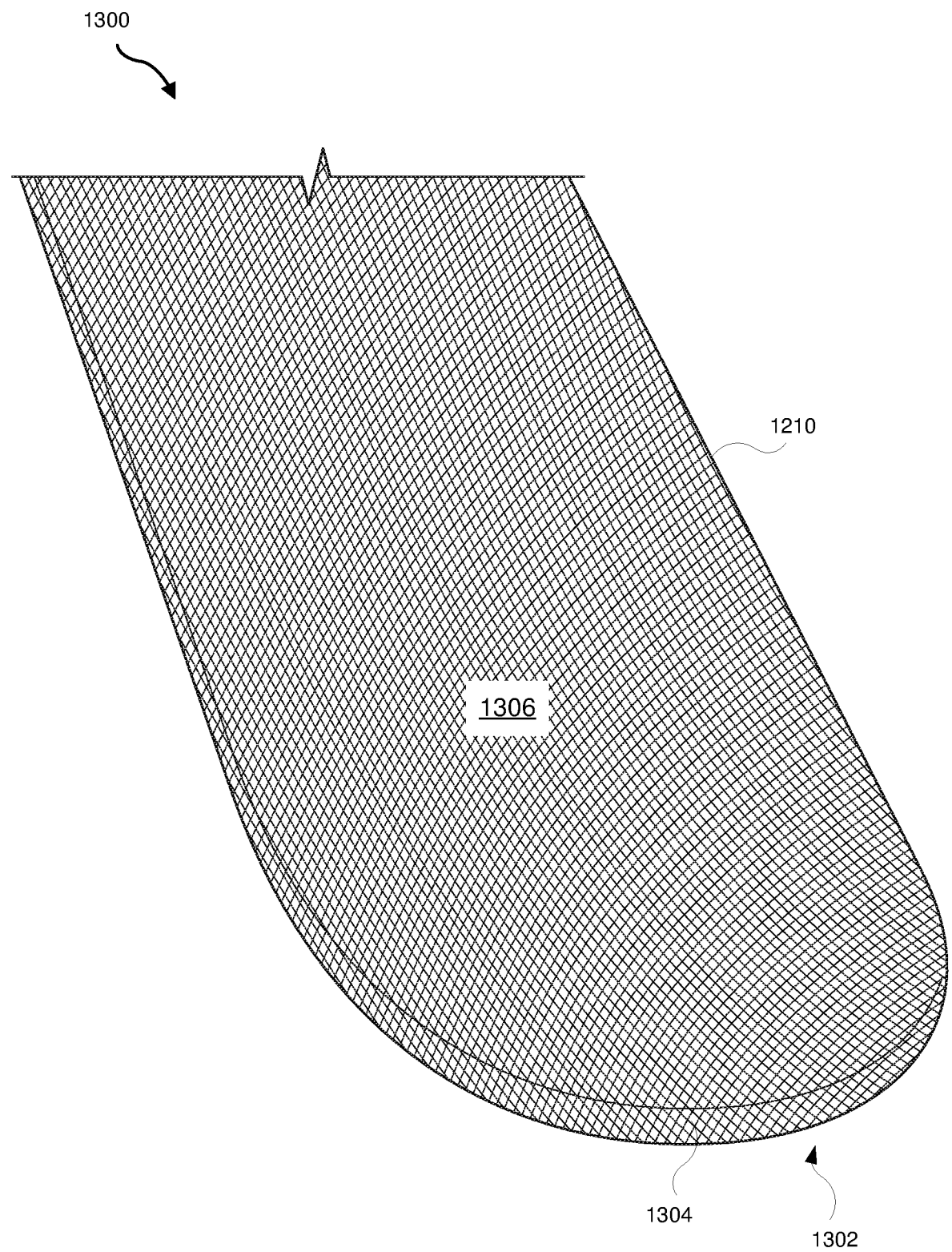
FIG. 13 is an illustration of an example top view of a strap end.
Figure 14:
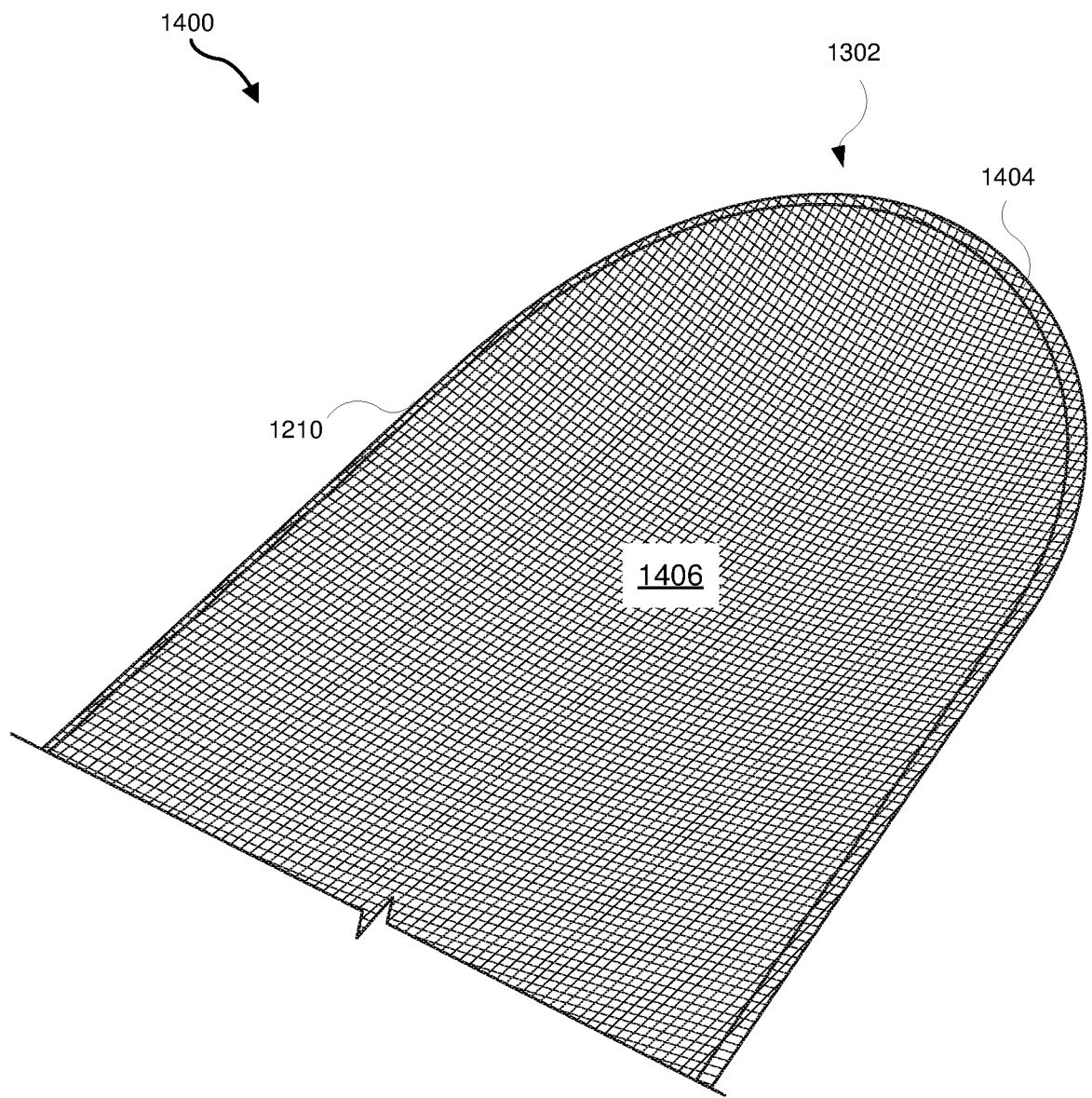
FIG. 14 is an illustration of an example bottom view of a strap end.
Figure 15:
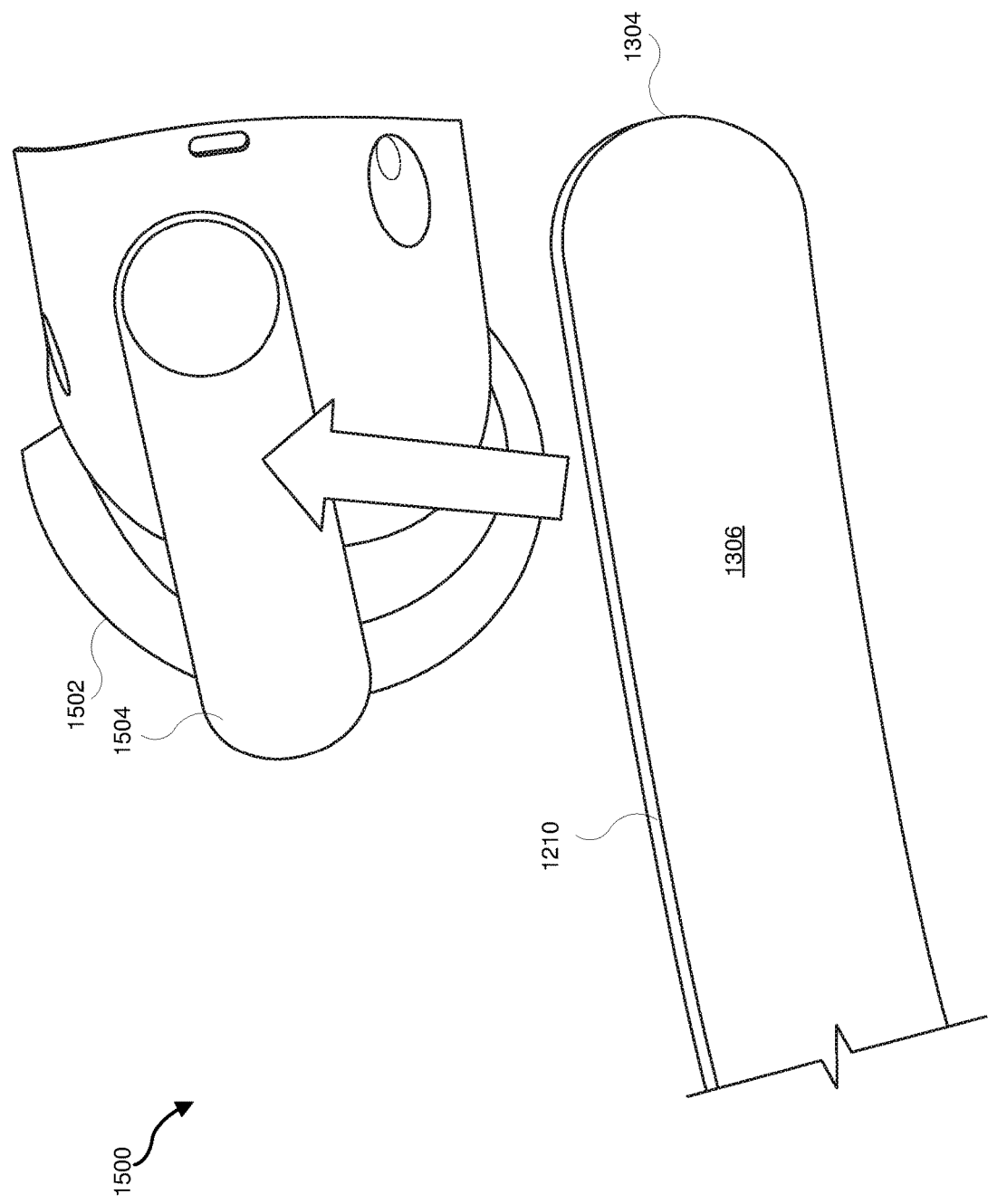
FIG. 15 is an illustration of showing how a strap with a finished end may be attached to a virtual reality (VR) headset.

FIGS. 13 and 14 are illustrations of a top view and a bottom view, respectively, of a finished end of a strap after shaping, setting, and cutting. As shown in both figures, the finished end of the strap is uniform and smooth without any fraying.

FIG. 13 is an illustration of an example top view 1300 of a strap end (e.g., the strap end 1210 as shown for example in FIG. 12B). As described herein, and in particular with reference to FIGS. 10A, 10B, 11, 12A, and 12B, the top view 1300 is of the strap 1000 after one end of the strap 1000 was placed in an end-shaping tool (e.g., the end-shaping tool 300 as described with reference to FIG. 3), then placed in an end-setting tool (e.g., the end-setting tool 600), and then cut providing a finished end 1302 to the end of the strap 1000 (the strap end 1210). The finished end 1302 of the strap end 1210 provides a finished end to the end of the strap 1000 without any fraying. A finished end top view 1304 shows the finished end 1302 of the strap end 1210 as viewed from a front of the strap 1000 (e.g., strap front 1306). As viewed from the strap front 1306, the finished end 1302 of the strap end 1210 provides a clean smooth edge to the cut end of the strap 1000.

FIG. 14 is an illustration of an example bottom view 1400 of a strap end (e.g., the strap end 1210 as shown, for example, in FIG. 12B). As described herein, and in particular with reference to FIGS. 10A, 10B, 11, 12A, 12B, and 13, the bottom view 1400 is of the strap 1000 after one end of the strap 1000 was placed in an end-shaping tool (e.g., the end-shaping tool 300 as described with reference to FIG. 3), then placed in an end-setting tool (e.g., the end-setting tool 600), and then cut providing the finished end 1302 to the end of the strap 1000 (the strap end 1210). The finished end 1302 of the strap end 1210 provides a finished end to the end of the strap 1000 without any fraying. A finished end bottom view 1404 shows the finished end 1302 of the strap end 1210 as viewed from a back of the strap 1000 (e.g., strap back 1406). The finished end 1302 of the strap end 1210 may be folded or rolled over from the strap front 1306 to the strap back 1406 and processed and finished as described herein to form a finished rolled edge on the strap end 1210. As viewed from the strap back 1406, the finished end 1302 of the strap end 1210 provides a clean smooth rolled edge to the cut end of the strap 1000.

Figure 16:
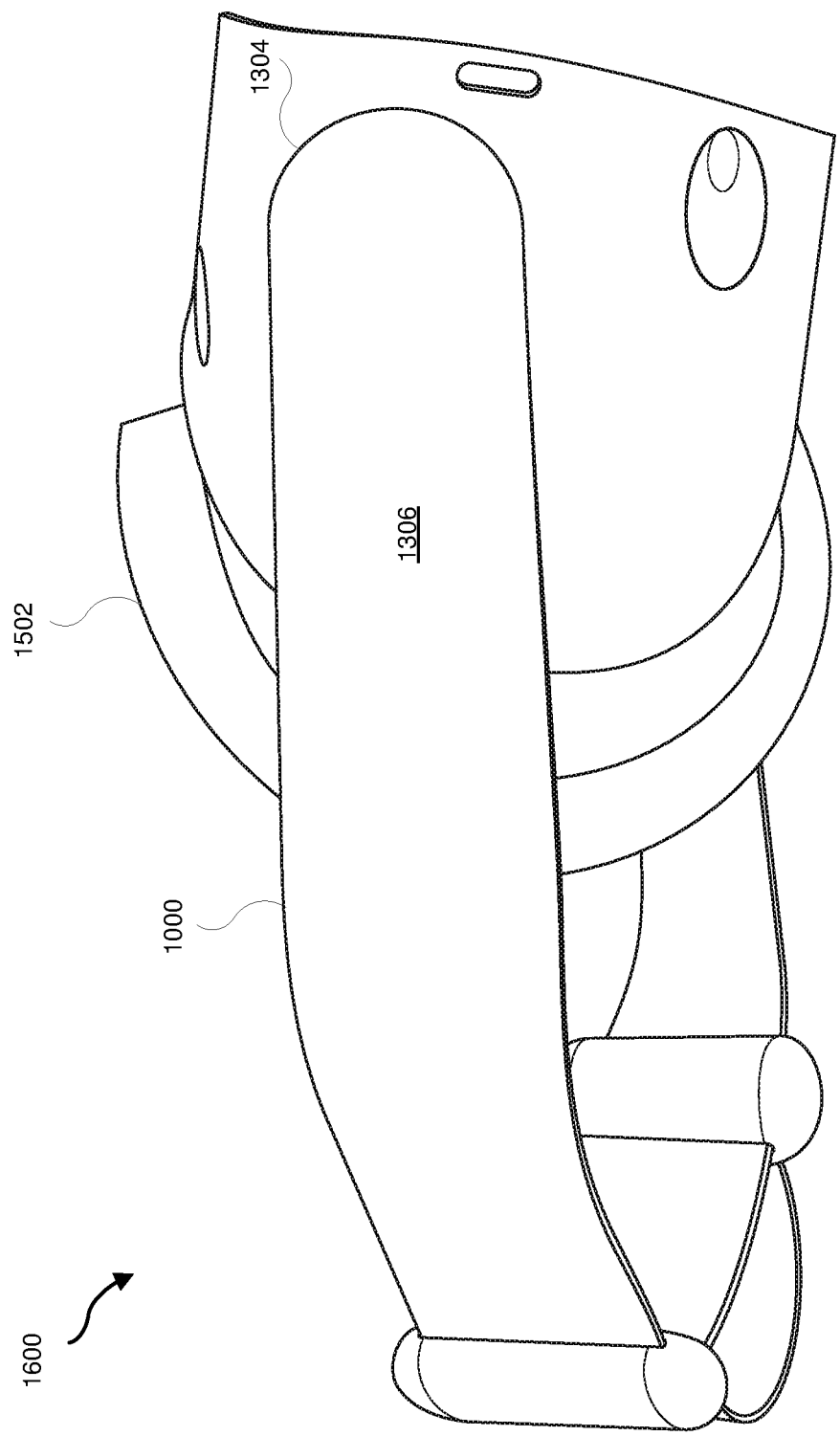
FIG. 16 is an illustration of showing a strap with a finished end attached to a virtual reality (VR) headset.

FIG. 15 is an illustration 1500 showing how a strap with a finished end (e.g., the strap 1000 with the strap end 1210 as shown, for example, in FIGS. 12A, 12B, 13 and 14) may be placed on (affixed to, attached to) a virtual reality (VR) headset 1502. For example, the strap end 1210 may be attached to, placed on, affixed to, snapped on, a side arm 1504 of the VR headset 1502. FIG. 16. is another illustration 1600 showing a strap (e.g., the strap 1000 as shown, for example, in FIGS. 10A, 10B, 11, 12A, 12B, 13 and 14) with a finished end attached to a VR headset (e.g., the VR headset 1502 as shown in FIG. 15).

Figure 17:
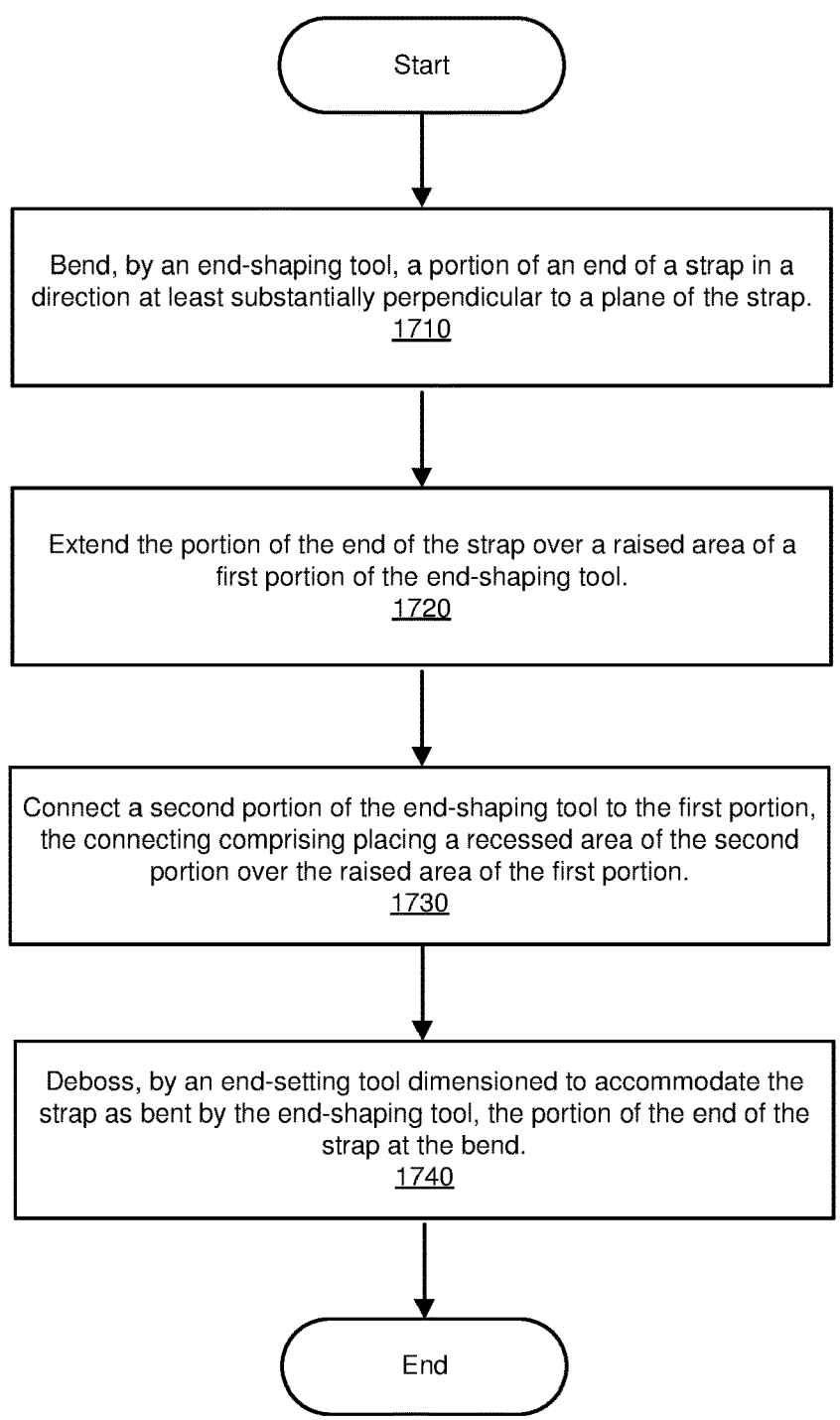
FIG. 17 is a flow diagram of an exemplary method for finishing a yarned strap by debossing an end of the strap.

FIG. 17 is a flow diagram of an exemplary method 1700 for finishing a yarned strap by debossing an end of a strap. The steps shown in FIG. 17 may be performed by the tools, apparatus and/or systems described and/or illustrated herein. In one example, each of the steps shown in FIG. 17 may represent a process that includes and/or is represented by multiple sub-steps, examples of which will be provided in greater detail below. In some implementations, the tools, apparatus and/or systems described and/or illustrated herein may perform the steps shown in FIG. 17 as part of an automated manufacturing process. For example, the automated factory process may be for the manufacture of a strap for attaching to a VR headset.

As illustrated in FIG. 17, at step 1710 one or more of the apparatus, systems, or tools described herein may bend, by an end-shaping tool, a portion of an end of a strap in a direction at least substantially perpendicular to a plane of the strap. For example, an end-shaping tool (e.g., the end-shaping tool 300) may perform the bending of the portion of the end of a strap as described herein.

In some embodiments, the term "strap" may refer to a piece of material or fabric that may be used to fasten, connect, or otherwise attached one item to another. Examples of a strap include, without limitation, a piece or strip of fabric made from a material woven in strips or bands. The fabric may include woven yarns. The strap may be cut to a desired size or length.

In some embodiments, the term "bend" may refer to the bending, folding, reshaping, or otherwise manipulating of an end of a strap (e.g., a cut end of a strap) as described herein. Examples of bending include, without limitation, reshaping a substantially straight object in order to provide a curve or angle to the object, reshaping the object by applying a force that results in providing a curve or angle to the object. For example, bending a portion of an end of a strap may include folding down an end of a strap that may be frayed, folding down the end of a strap using an end-shaping tool (e.g., the end-shaping tool 300 as described with reference to FIG. 3) such that the portion of end to be folded is located over a first portion of an end-shaping tool (e.g., the first portion 302), positioning a second portion of the end-shaping tool (e.g., the second portion 304) over the first portion, and then applying a force to a top edge of the second portion causing the strap to bend at the portion of the end located over the first portion.

The apparatus, systems, or tools described herein may perform step 1710 in a variety of ways. In one example, referring to FIGS. 1A-B, 2, and 3, the strap 222 may be dimensioned such that a the width 124 of the strap 222 allows the strap 222 to be positioned or placed on the raised area 306 of the first portion 302 of the end-shaping tool 300 such that the end 224 of the strap 222 extends beyond the raised area 306, positioning or placing an inner location 248 of the strap 222 in substantial alignment with the raised edge 308 as a location on the strap where a bending, folding, or reshaping of the strap may occur such that the end 224 of the strap 222 may be bent in a direction perpendicular to a plane of the strap.

As illustrated in FIG. 17, at step 1720 one or more of the apparatus, systems, or tools described herein may, when bending the portion of the end of the strap in a direction perpendicular to the plane of the strap, extend the portion of the end of the strap over a raised area of a first portion of the end-shaping tool. For example, referring to FIG. 3, the end of the strap may extend beyond the raised area 306 of the end-shaping tool 300.

The apparatus, systems, or tools described herein may perform step 1720 in a variety of ways. In one example, referring to FIG. 2, an end-shaping tool may include a first portion 202 and a second portion 204. The end 224 of the strap 222 may extend over a part of the first portion 202 (e.g., a first portion edge 226 of the first portion 202) such that an inner location 248 of the strap 222 is in substantial alignment with the first portion edge 226 of the first portion 202. The inner location 248 of the strap 222 may be identified as a location on the strap 222 where a bending, folding, or reshaping of the strap 222 may begin. In another example, referring to FIGS. 1A, 1B, and 2, the end 224 of the strap 222 may extend beyond the raised area 306 of the first portion 302 of the end-shaping tool 300, positioning or placing a location on the strap where a bend, folding, or reshaping of the strap may begin (e.g., an inner location 248 of the strap 222) in substantial alignment with the raised edge 308. Such positioning or placement of the strap 222 on the first portion 302 of the end-shaping tool 300 may result in the outer edge 242 of the strap 222 overhanging a front end 314 of the first portion 302 of the end-shaping tool 300.

As illustrated in FIG. 17, at step 1730 one or more of the apparatus, systems, or tools described herein may, when bending the portion of the end of the strap in a direction perpendicular to the plane of the strap, connect a second portion of the end-shaping tool to the first portion, the connecting comprising placing a recessed area of the second portion over the raised area of the first portion. For example, referring to FIG. 3, the recessed area 310 of the second portion 304 of the end-shaping tool 300 may be dimensioned to accommodate the raised area 306 of the first portion 302 of the end-shaping tool 300 when the second portion 304 is positioned on or on top of (placed on or on top of) the first portion 302. In addition, or in the alternative, in another example, a raised area 322 of the second portion 304 of the end-shaping tool 300 may be dimensioned to accommodate a recessed area 324 of the first portion 302 of the end-shaping tool 300 when the second portion 304 is positioned on or on top of (placed on or on top of) the first portion 302.

The apparatus, systems, or tools described herein may perform step 1730 in a variety of ways. In one example, referring to FIGS. 1A, 1B, and 2, a force (e.g., the force 240) applied to a top edge of the second portion 304 of the end-shaping tool 300 when the second portion 304 of the end-shaping tool 300 is positioned on the first portion 302 of the end-shaping tool 300 may cause the strap 222 to bend, fold, or otherwise be reshaped at a location on the strap that substantially aligns with the raised edge 308 of the end-shaping tool 300. Positioning the second portion 304 of the end-shaping tool 300 on or on top of the first portion 302 of the end-shaping tool 300, encases a portion of the strap 222 (e.g., the end 224 of the strap 222), providing a folding or bending of the strap 222 at a location on the strap (e.g., the location 246) that substantially aligns with the raised edge 308 of the end-shaping tool 300.

As illustrated in FIG. 17, at step 1740 one or more of the apparatus, systems, or tools described herein may deboss, by an end-setting tool dimensioned to accommodate the strap as bent by the end-shaping tool, the portion of the end of the strap at the bend. For example, referring to FIG. 6, a debossing tool 606 included in the end-setting tool 600 may be placed around the rounded end of the strap that overhangs the rounded end 616 of the fixture base 602 of the end-setting tool 600 and may deboss the portion of the end 224 of the strap 222 at substantially approximate to the bend in the strap 222.

In some embodiments, the term "deboss" may refer to stamping or otherwise forming an indentation in a surface of an object. Examples of debossing include, without limitation, forming an indentation or other type of formation in a surface of an end of a strap by applying a combination of heat and pressure to the end of the strap causing the fibers in the material of the strap to melt and adhere to one another.

The apparatus, systems, or tools described herein may perform step 1740 in a variety of ways. In one example, referring to FIG. 6, the debossing tool 606 included in the end-setting tool 600 may include a front portion 626 and a rear portion 644. The front portion 626 of the debossing tool 606 may be placed or positioned between the front end 610 of the fixture base 602 and a bottom 628 of the fixture insulator 604. Risers 630a-b are dimensioned to accommodate positioning or placing of the front portion 626 of the debossing tool 606 between the front end 610 of the fixture base 602 and a bottom 628 of the fixture insulator 604 when the fixture insulator 604 is attached, secured, or connected to the fixture base 602 as described herein. Once the debossing tool 606 is positioned, the portion of the end of the strap at the bend may be debossed.

As described herein, when the strap is cut along the debossed portion, fraying at the cut end is essentially eliminated. In some implementations, an end-setting tool (e.g., the end-setting tool 600 as described with reference to FIG. 6) may emboss the portion of the end of the strap at the bend similar to the debossing described herein, such that when the strap is cut along the embossed portion, fraying at the cut end is essentially eliminated. In some embodiments, the term "emboss" may refer to forming a raised area in a surface of an object. Examples of debossing include, without limitation, forming a raised area or other type of formation in a surface of an end of a strap by applying a combination of heat and pressure to the end of the strap causing the fibers in the material of the strap to melt and adhere to one another. For example, referring to FIG. 6, the rounded end 616 of the raised portion 614 of the fixture base 602 may heat a bent portion of a strap that is placed on the fixture base 602 with the bent portion positioned over the rounded end 616, essentially heating an emboss area of the strap.

The apparatus, systems, and methods for finishing a yarned strap described herein may eliminate fraying at a cut end of a strap that may comprise one of an elastic, a webbing, or other woven or yarned fabric that may be woven in strips or bands. An end-shaping tool may be designed to fold down the frayed cut end of the strap by encasing the cut end of the strap in the tool while applying enough heat to relax and set the fibers in the cut end of the strap without shrinking the strap. The folded end of the strap may then be placed (encased) in an end-setting tool that may apply heat to the folded end of the strap. The heat may melt the fibers in the folded end of the strap above a frayed portion in a deboss region of the folded end of the strap without shrinking the strap. The deboss region may be at the beginning of the folded end of the strap and above the frayed cut end of the strap. A cutter may cut the cut end of the strap in the deboss region, resulting in the cut end of the strap being a finished end of the strap that is clean and free of any fraying. The ability to cut an end of a strap and then process the cut end to eliminate any fraying may result in a better, more reliable, and more attractive connection between two items as connected by the strap.

EXAMPLE EMBODIMENTS

Example 1

A method may include bending, by an end-shaping tool, a portion of an end of a strap in a direction at least substantially perpendicular to a plane of the strap. The bending may include extending the portion of the end of the strap over a raised area of a first portion of the end-shaping tool and connecting a second portion of the end-shaping tool to the first portion. The connecting may include placing a recessed area of the second portion over the raised area of the first portion. The method may include debossing, by an end-setting tool dimensioned to accommodate the strap as bent by the end-shaping tool, the portion of the end of the strap at the bend.

Example 2

The method of Example 1, where the debossing may include heating the portion of the end of the strap along the bend in a direction at least substantially parallel to the bend.

Example 3

The method of any of Examples 1 and 2, further including cutting, by the end-setting tool, the strap in the direction at least substantially parallel to the bend at the debossed portion of the end of the strap.

Example 4

The method of any of Examples 1-3, where cutting the strap in the direction at least substantially parallel to the bend at the debossed portion of the end of the strap may include cutting the portion of the end of the strap in the direction at least substantially parallel to the bend while debossing the portion of the end of the strap.

Example 5

The method of any of Examples 1-4, where the strap may be an elastic.

Example 6

The method of any of Examples 1-5, where bending the portion of the end of the strap in a direction at least substantially perpendicular to the plane of the strap may further include heating the portion of the end of the strap at the bend at the raised area of the first portion of the end-shaping tool to a temperature that sets fibers in the portion of the end of the strap at the bend.

Example 7

The method of any of Examples 1-6, where heating the portion of the end of the strap along the bend may include heating a deboss region in the portion of the end of the strap at the bend to a temperature that melts fibers in the deboss region.

Example 8

The method of any of Examples 1-7, where the debossing may further include insulating, by the end-setting tool, a portion of the strap located above the deboss region from the heat applied to the deboss region.

Example 9

A system may include an end-shaping tool that may include a first portion including a raised area, and a second portion including a recessed area dimensioned to fit over the raised area when the second portion is connected to the first portion. The end-shaping tool may be configured to bend a portion of an end of a strap in a direction at least substantially perpendicular to a plane of the strap when the portion of the end of the strap extends over the raised area and when the second portion is connected to the first portion. The system may include an end-setting tool dimensioned to accommodate the strap as bent by the end-shaping tool. The end-setting tool may include a base dimensioned to accommodate the bend in the portion of the end of the strap and a debossing tool configured to deboss the portion of the end of the strap at the bend.

Example 10

The system of Example 9, the debossing tool being further configured to deboss the portion of the end of the strap at the bend in a direction at least substantially parallel to the bend by heating the portion of the end of the strap along the bend.

Example 11

The system of any of Examples 9 and 10, where the system may further include a cutter configured to cut the strap in the direction at least substantially parallel to the bend at the debossed portion of the end of the strap.

Example 12

The system of any of Examples 9-11, where the cutter may be included in the end-setting tool and where the cutter may be configured to cut the portion of the end of the strap at the bend in the direction at least substantially parallel to the bend as the debossing tool debosses the portion of the end of the strap at the bend.

Example 13

The system of any of Examples 9-12, where the cutter may be an ultrasonic cutter.

Example 14

The system of any of Examples 9-13, where the strap may be an elastic.

Example 15

The system of any of Examples 9-14, where the end-shaping tool may be further configured to heat the portion of the end of the strap at the bend at the raised area of the first portion of the end-shaping tool to a temperature that sets fibers in the portion of the end of the strap at the bend.

Example 16

The system of any of Examples 9-15, where the end-setting tool may further include a top including an insulator region configured to insulate a portion of the strap not included in the bend and where the debossing tool may be further configured to heat a deboss region in the portion of the end of the strap at the bend to a temperature that melts fibers in the deboss region.

Example 17

The system of any of Examples 9-16, where the portion of the end of the strap at the bend may include an insulated region located above the deboss region and where the end-setting tool may further include an insulator tool configured to insulate the insulated region from the heat applied by the debossing tool to the deboss region.

Example 18

The system of any of Examples 9-17, where the end-setting tool may further include a top including an insulator region configured to insulate the portion of the strap not included in the bend and secure, in the base, the portion of the strap not included in the bend, and where the insulator tool may be further configured to secure the portion of the end of the strap at the bend in the base.

Example 19

An apparatus may include a top including an insulator region configured to insulate a first portion of a strap, a base dimensioned to accommodate a bend in a second portion of the strap, the bend being at an end of the strap and including a first region and a second region, an insulator tool configured to insulate the first region of the bend, a debossing tool configured to deboss the second region of the bend in a direction at least substantially parallel to the bend, and a cutter configured to cut the strap at the second region and in the direction at least substantially parallel to the bend.

Example 20

The apparatus of Example 19, where the strap may be an elastic, where fibers included in the first portion may be set, and where debossing the second region of the bend in the direction at least substantially parallel to the bend may include heating the second region to a temperature that melts fibers in the second region.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality system 1800 in FIG. 18) or that visually immerses a user in an artificial reality (e.g., virtual-reality system 1900 in FIG. 19). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 18:
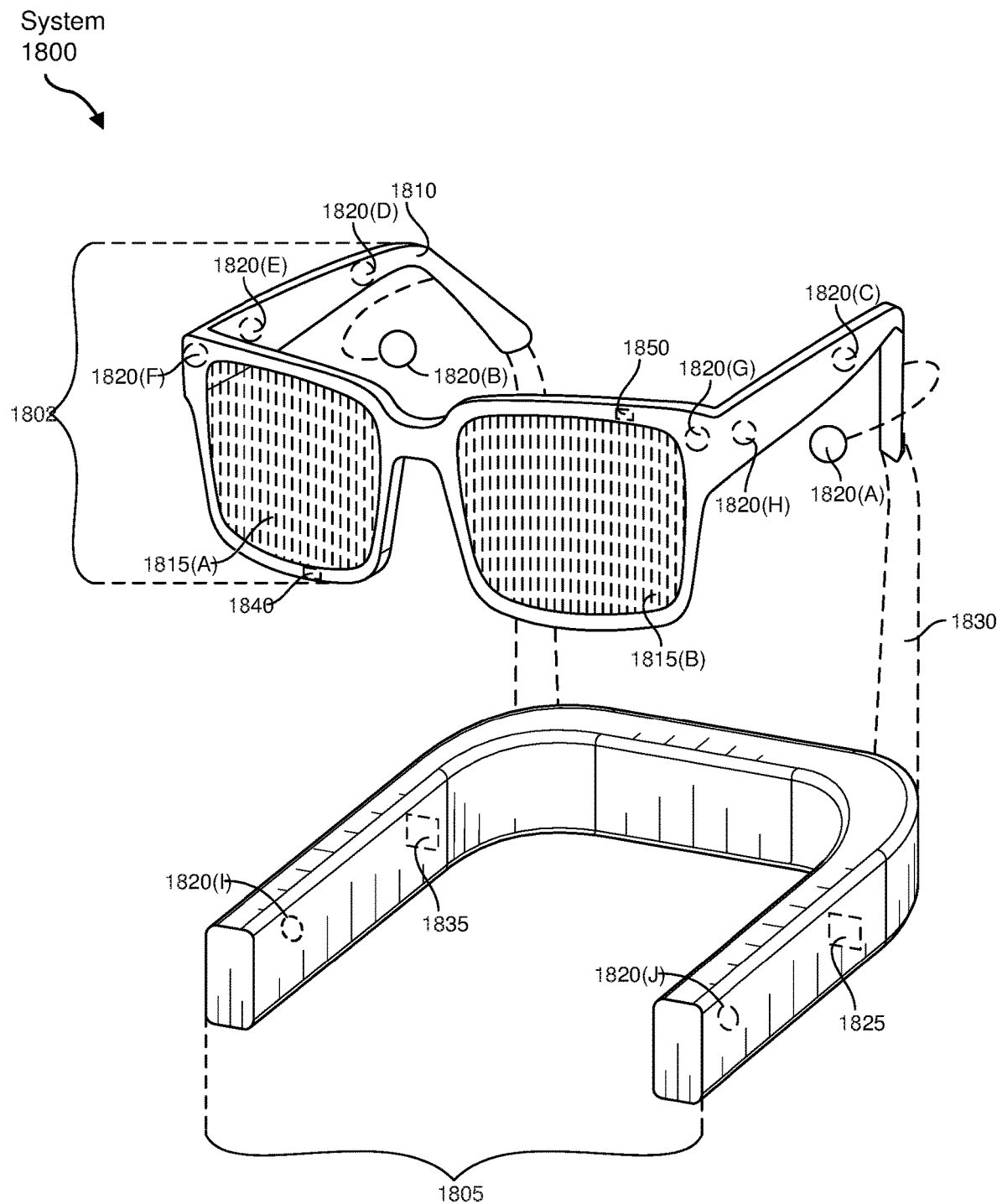
FIG. 18 is an illustration of exemplary augmented-reality glasses that may be used in connection with embodiments of this disclosure.
Figure 19:
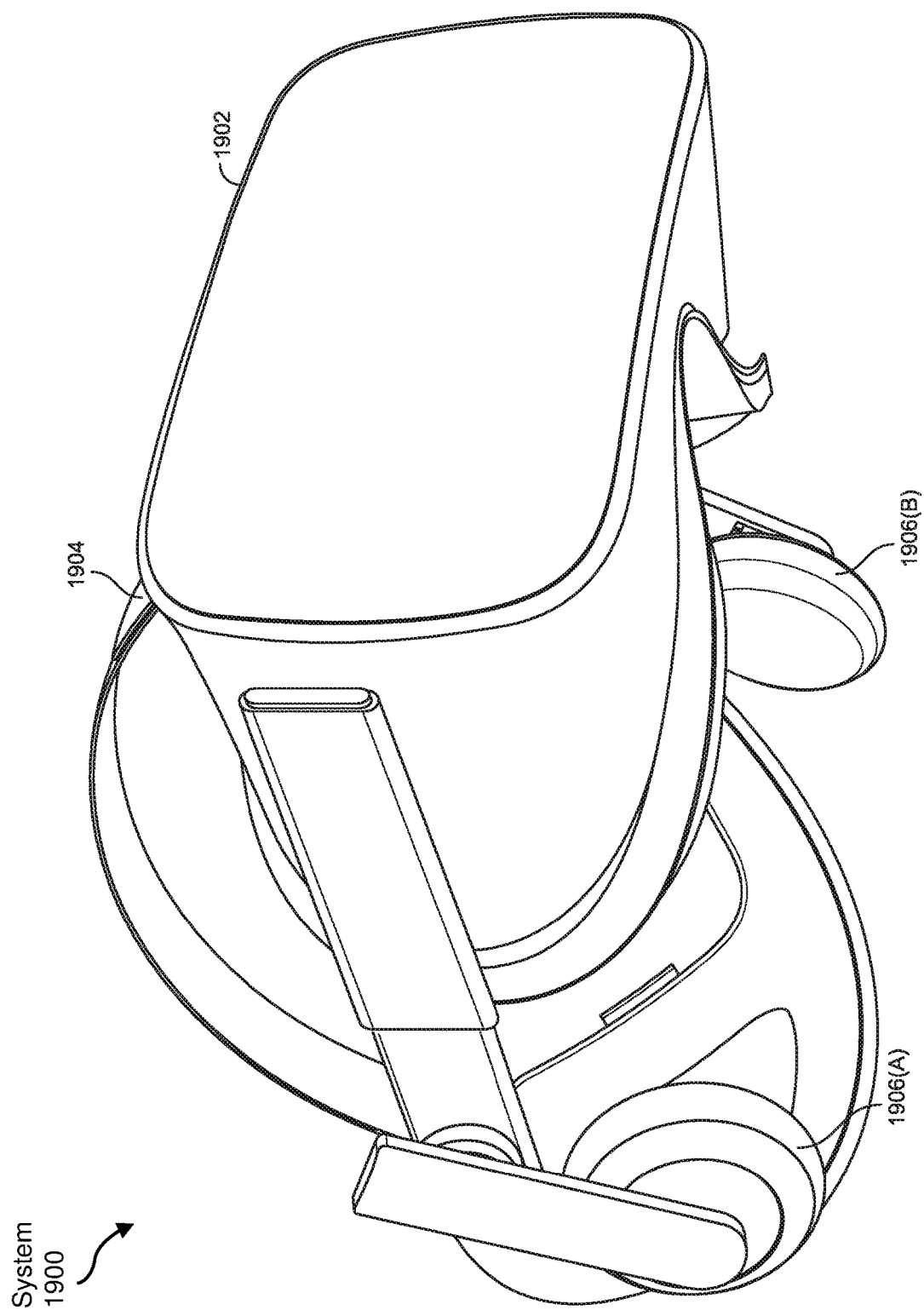
FIG. 19 is an illustration of an exemplary virtual-reality headset that may be used in connection with embodiments of this disclosure.

Turning to FIG. 18, augmented-reality system 1800 may include an eyewear device 1802 with a frame 1810 configured to hold a left display device 1815(A) and a right display device 1815(B) in front of a user's eyes. Display devices 1815(A) and 1815(B) may act together or independently to present an image or series of images to a user. While augmented-reality system 1800 includes two displays, embodiments of this disclosure may be implemented in augmented-reality systems with a single NED or more than two NEDs.

In some embodiments, augmented-reality system 1800 may include one or more sensors, such as sensor 1840. Sensor 1840 may generate measurement signals in response to motion of augmented-reality system 1800 and may be located on substantially any portion of frame 1810. Sensor 1840 may represent a position sensor, an inertial measurement unit (IMU), a depth camera assembly, a structured light emitter and/or detector, or any combination thereof. In some embodiments, augmented-reality system 1800 may or may not include sensor 1840 or may include more than one sensor. In embodiments in which sensor 1840 includes an IMU, the IMU may generate calibration data based on measurement signals from sensor 1840. Examples of sensor 1840 may include, without limitation, accelerometers, gyroscopes, magnetometers, other suitable types of sensors that detect motion, sensors used for error correction of the IMU, or some combination thereof.

Augmented-reality system 1800 may also include a microphone array with a plurality of acoustic transducers 1820(A)-1820(J), referred to collectively as acoustic transducers 1820. Acoustic transducers 1820 may be transducers that detect air pressure variations induced by sound waves. Each acoustic transducer 1820 may be configured to detect sound and convert the detected sound into an electronic format (e.g., an analog or digital format). The microphone array in FIG. 2 may include, for example, ten acoustic transducers: 1820(A) and 1820(B), which may be designed to be placed inside a corresponding ear of the user, acoustic transducers 1820(C), 1820(D), 1820(E), 1820(F), 1820(G), and 1820(H), which may be positioned at various locations on frame 1810, and/or acoustic transducers 1820(I) and 1820(J), which may be positioned on a corresponding neckband 1805.

In some embodiments, one or more of acoustic transducers 1820(A)-(F) may be used as output transducers (e.g., speakers). For example, acoustic transducers 1820(A) and/or 1820(B) may be earbuds or any other suitable type of headphone or speaker.

The configuration of acoustic transducers 1820 of the microphone array may vary. While augmented-reality system 1800 is shown in FIG. 18 as having ten acoustic transducers 1820, the number of acoustic transducers 1820 may be greater or less than ten. In some embodiments, using higher numbers of acoustic transducers 1820 may increase the amount of audio information collected and/or the sensitivity and accuracy of the audio information. In contrast, using a lower number of acoustic transducers 1820 may decrease the computing power required by an associated controller 1850 to process the collected audio information. In addition, the position of each acoustic transducer 1820 of the microphone array may vary. For example, the position of an acoustic transducer 1820 may include a defined position on the user, a defined coordinate on frame 1810, an orientation associated with each acoustic transducer 1820, or some combination thereof.

Acoustic transducers 1820(A) and 1820(B) may be positioned on different parts of the user's ear, such as behind the pinna, behind the tragus, and/or within the auricle or fossa. Or, there may be additional acoustic transducers 1820 on or surrounding the ear in addition to acoustic transducers 1820 inside the ear canal. Having an acoustic transducer 1820 positioned next to an ear canal of a user may enable the microphone array to collect information on how sounds arrive at the ear canal. By positioning at least two of acoustic transducers 1820 on either side of a user's head (e.g., as binaural microphones), augmented-reality device 1800 may simulate binaural hearing and capture a 3D stereo sound field around about a user's head. In some embodiments, acoustic transducers 1820(A) and 1820(B) may be connected to augmented-reality system 1800 via a wired connection 1830, and in other embodiments acoustic transducers 1820(A) and 1820(B) may be connected to augmented-reality system 1800 via a wireless connection (e.g., a Bluetooth connection). In still other embodiments, acoustic transducers 1820(A) and 1820(B) may not be used at all in conjunction with augmented-reality system 1800.

Acoustic transducers 1820 on frame 1810 may be positioned along the length of the temples, across the bridge, above or below display devices 1815(A) and 1815(B), or some combination thereof. Acoustic transducers 1820 may be oriented such that the microphone array is able to detect sounds in a wide range of directions surrounding the user wearing the augmented-reality system 1800. In some embodiments, an optimization process may be performed during manufacturing of augmented-reality system 1800 to determine relative positioning of each acoustic transducer 1820 in the microphone array.

In some examples, augmented-reality system 1800 may include or be connected to an external device (e.g., a paired device), such as neckband 1805. Neckband 1805 generally represents any type or form of paired device. Thus, the following discussion of neckband 1805 may also apply to various other paired devices, such as charging cases, smart watches, smart phones, wrist bands, other wearable devices, hand-held controllers, tablet computers, laptop computers, other external compute devices, etc.

As shown, neckband 1805 may be coupled to eyewear device 1802 via one or more connectors. The connectors may be wired or wireless and may include electrical and/or non-electrical (e.g., structural) components. In some cases, eyewear device 1802 and neckband 1805 may operate independently without any wired or wireless connection between them. While FIG. 18 illustrates the components of eyewear device 1802 and neckband 1805 in example locations on eyewear device 1802 and neckband 1805, the components may be located elsewhere and/or distributed differently on eyewear device 1802 and/or neckband 1805. In some embodiments, the components of eyewear device 1802 and neckband 1805 may be located on one or more additional peripheral devices paired with eyewear device 1802, neckband 1805, or some combination thereof.

Pairing external devices, such as neckband 1805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1800 may be provided by a paired device or shared between a paired device and an eyewear device, thus reducing the weight, heat profile, and form factor of the eyewear device overall while still retaining desired functionality. For example, neckband 1805 may allow components that would otherwise be included on an eyewear device to be included in neckband 1805 since users may tolerate a heavier weight load on their shoulders than they would tolerate on their heads. Neckband 1805 may also have a larger surface area over which to diffuse and disperse heat to the ambient environment. Thus, neckband 1805 may allow for greater battery and computation capacity than might otherwise have been possible on a stand-alone eyewear device. Since weight carried in neckband 1805 may be less invasive to a user than weight carried in eyewear device 1802, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1805 may be communicatively coupled with eyewear device 1802 and/or to other devices. These other devices may provide certain functions (e.g., tracking, localizing, depth mapping, processing, storage, etc.) to augmented-reality system 1800. In the embodiment of FIG. 18, neckband 1805 may include two acoustic transducers (e.g., 1820(I) and 1820(J)) that are part of the microphone array (or potentially form their own microphone subarray). Neckband 1805 may also include a controller 1825 and a power source 1835.

Acoustic transducers 1820(I) and 1820(J) of neckband 1805 may be configured to detect sound and convert the detected sound into an electronic format (analog or digital). In the embodiment of FIG. 18, acoustic transducers 1820(I) and 1820(J) may be positioned on neckband 1805, thereby increasing the distance between the neckband acoustic transducers 1820(I) and 1820(J) and other acoustic transducers 1820 positioned on eyewear device 1802. In some cases, increasing the distance between acoustic transducers 1820 of the microphone array may improve the accuracy of beamforming performed via the microphone array. For example, if a sound is detected by acoustic transducers 1820(C) and 1820(D) and the distance between acoustic transducers 1820(C) and 1820(D) is greater than, e.g., the distance between acoustic transducers 1820(D) and 1820(E), the determined source location of the detected sound may be more accurate than if the sound had been detected by acoustic transducers 1820(D) and 1820(E).

Controller 1825 of neckband 1805 may process information generated by the sensors on neckband 1805 and/or augmented-reality system 1800. For example, controller

1825 may process information from the microphone array that describes sounds detected by the microphone array. For each detected sound, controller 1825 may perform a direction-of-arrival (DOA) estimation to estimate a direction from which the detected sound arrived at the microphone array. As the microphone array detects sounds, controller 1825 may populate an audio data set with the information. In embodiments in which augmented-reality system 1800 includes an inertial measurement unit, controller 1825 may compute all inertial and spatial calculations from the IMU located on eyewear device 1802. A connector may convey information between augmented-reality system 1800 and neckband 1805 and between augmented-reality system 1800 and controller 1825. The information may be in the form of optical data, electrical data, wireless data, or any other transmittable data form. Moving the processing of information generated by augmented-reality system 1800 to neckband 1805 may reduce weight and heat in eyewear device 1802, making it more comfortable to the user.

Power source 1835 in neckband 1805 may provide power to eyewear device 1802 and/or to neckband 1805. Power source 1835 may include, without limitation, lithium ion batteries, lithium-polymer batteries, primary lithium batteries, alkaline batteries, or any other form of power storage. In some cases, power source 1835 may be a wired power source. Including power source 1835 on neckband 1805 instead of on eyewear device 1802 may help better distribute the weight and heat generated by power source 1835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1900 in FIG. 19, that mostly or completely covers a user's field of view. Virtual-reality system 1900 may include a front rigid body 1902 and a band 1904 shaped to fit around a user's head. Virtual-reality system 1900 may also include output audio transducers 1906(A) and 1906(B). Furthermore, while not shown in FIG. 19, front rigid body 1902 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 1800 and/or virtual-reality system 1900 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 1800 and/or virtual-reality system 1900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system augmented-reality system 1800 and/or virtual-reality system 1900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 1900, 1906(A), and 1906(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

While not shown in FIG. 1900, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   bending, by an end-shaping tool, a portion of an end of a strap in a direction at least substantially perpendicular to a plane of the strap, the bending comprising:
      extending the portion of the end of the strap over a raised area of a first portion of the end-shaping tool; and
      connecting a second portion of the end-shaping tool to the first portion, the connecting comprising placing a recessed area of the second portion over the raised area of the first portion; and
   debossing, by an end-setting tool dimensioned to accommodate the strap as bent by the end-shaping tool, the portion of the end of the strap at the bend.

2. The method of claim 1, wherein the debossing comprises heating the portion of the end of the strap along the bend.

3. The method of claim 2, further comprising cutting, by the end-setting tool, the strap at the debossed portion of the end of the strap.

4. The method of claim 3, wherein cutting the strap at the debossed portion of the end of the strap comprises cutting the portion of the end of the strap while debossing the portion of the end of the strap.

5. The method of claim 2, wherein heating the portion of the end of the strap along the bend comprises heating a deboss region in the portion of the end of the strap at the bend to a temperature that melts fibers in the deboss region.

6. The method of claim 5, wherein the debossing further comprises insulating, by the end-setting tool, a portion of the strap located above the deboss region from the heat applied to the deboss region.

7. The method of claim 1, wherein the strap comprises an elastic.

8. The method of claim 7, wherein bending the portion of the end of the strap in a direction at least substantially perpendicular to the plane of the strap further comprises heating the portion of the end of the strap at the bend at the raised area of the first portion of the end-shaping tool to a temperature that sets fibers in the portion of the end of the strap at the bend.

9. A system comprising:
   an end-shaping tool comprising:
      a first portion comprising a raised area; and
      a second portion comprising a recessed area dimensioned to fit over the raised area when the second portion is connected to the first portion, the end-shaping tool configured to bend a portion of an end of a strap in a direction at least substantially perpendicular to a plane of the strap when the portion of the end of the strap extends over the raised area and when the second portion is connected to the first portion; and
   an end-setting tool dimensioned to accommodate the strap as bent by the end-shaping tool, the end-setting tool comprising:
      a base dimensioned to accommodate the bend in the portion of the end of the strap; and
      a debossing tool configured to deboss the portion of the end of the strap at the bend.

10. The system of claim 9, wherein the debossing tool is further configured to deboss the portion of the end of the strap at the bend heating the portion of the end of the strap along the bend.

11. The system of claim 10, further comprising a cutter configured to cut the strap at the debossed portion of the end of the strap.

12. The system of claim 11,
   wherein the cutter is included in the end-setting tool; and
   wherein the cutter is configured to cut the portion of the end of the strap at the bend as the debossing tool debosses the portion of the end of the strap at the bend.

13. The system of claim 11, wherein the cutter comprises an ultrasonic cutter.

14. The system of claim 9, wherein the strap comprises an elastic.

15. The system of claim 14, wherein the end-shaping tool is further configured to heat the portion of the end of the strap at the bend at the raised area of the first portion of the end-shaping tool to a temperature that sets fibers in the portion of the end of the strap at the bend.

16. The system of claim 9,
wherein the end-setting tool further comprises a top comprising an insulator region configured to insulate a portion of the strap not included in the bend; and
wherein the debossing tool is further configured to heat a deboss region in the portion of the end of the strap at the bend to a temperature that melts fibers in the deboss region.

17. The system of claim 16,
wherein the portion of the end of the strap at the bend comprises an insulated region located above the deboss region; and
wherein the end-setting tool further comprises an insulator tool configured to insulate the insulated region from the heat applied by the debossing tool to the deboss region.

18. The system of claim 17,
wherein the end-setting tool further comprises a top comprising an insulator region configured to:
  insulate the portion of the strap not included in the bend; and
  secure, in the base, the portion of the strap not included in the bend; and wherein the insulator tool is further configured to secure the portion of the end of the strap at the bend in the base.

19. An apparatus comprising:
a top comprising an insulator region configured to insulate a first portion of a strap;
a base dimensioned to accommodate a bend in a second portion of the strap, the bend being at an end of the strap and including a first region and a second region;
an insulator tool configured to insulate the first region of the bend;
a debossing tool configured to deboss the second region of the bend; and
a cutter configured to cut the strap at the second region.

20. The apparatus of claim 19,
wherein the strap is an elastic;
wherein fibers included in the first portion are set; and
wherein debossing the second region of the bend comprises heating the second region to a temperature that melts fibers in the second region.

* * * * *